US007247010B2

(12) United States Patent
Victorov et al.

(10) Patent No.: US 7,247,010 B2
(45) Date of Patent: Jul. 24, 2007

(54) SERVO CONTROL FOR CAPSULE MAKING MACHINE

(75) Inventors: Herman Victorov, Windsor (CA); Toma Tacescu, Windsor (CA); Corina Calin, Windsor (CA); Daniela Tacescu, Windsor (CA); Liviu Marcu, Windsor (CA); Victor Calin, Windsor (CA)

(73) Assignee: Technophar Equipment & Service Limited, Tecumseh, Ontario (CA)

( * ) Notice: Subject to any disclaimer, the term of this patent is extended or adjusted under 35 U.S.C. 154(b) by 445 days.

(21) Appl. No.: 10/677,141

(22) Filed: Oct. 1, 2003

(65) Prior Publication Data

US 2005/0073066 A1 Apr. 7, 2005

(51) Int. Cl.
*B29C 69/02* (2006.01)

(52) U.S. Cl. .......................... 425/5; 425/112; 425/145; 425/149

(58) Field of Classification Search .................... 425/5, 425/112, 145, 149, 449
See application file for complete search history.

(56) References Cited

U.S. PATENT DOCUMENTS 2,497,212 A * 2/1950 Donofrio ..................... 53/443
3,674,397 A * 7/1972 Harris ........................ 425/145
3,824,054 A * 7/1974 Harris ........................ 425/149
3,901,635 A * 8/1975 Greenberger ............... 425/145
4,368,165 A * 1/1983 Bergendahl ................ 264/40.4
4,817,367 A 4/1989 Ishikawa et al.
5,246,635 A 9/1993 Ratko et al.
5,271,881 A 12/1993 Redding, Jr.
5,422,160 A 6/1995 Ratko et al.
5,672,300 A 9/1997 Schurig et al.
5,682,733 A 11/1997 Perrone
5,735,105 A 4/1998 Stroud et al.
5,761,886 A 6/1998 Parkhideh
5,814,338 A 9/1998 Veronesi
5,945,136 A 8/1999 Victorov et al.
5,985,321 A 11/1999 Brox et al.
6,000,928 A 12/1999 Victorov et al.
6,022,499 A 2/2000 Schurig et al.
6,183,845 B1 2/2001 Ikemoto
6,238,616 B1 5/2001 Ishikawa et al.
6,352,717 B2 3/2002 Alex et al.
6,402,496 B2 6/2002 Ishikawa et al.
6,555,132 B1 4/2003 Brox et al.
6,569,363 B1 5/2003 Schurig et al.
6,589,536 B1 7/2003 Brox et al.
2001/0006689 A1 7/2001 Ishikawa et al.
2002/0006417 A1 1/2002 Alex et al.
2002/0153626 A1 10/2002 Manotas (Continued)

OTHER PUBLICATIONS

Rockwell Automation brochure, "Motion Control Selection Guide", Publication GMC-SG001H-EN-P, Publication Date: May 2003, pp. 4 pages.

*Primary Examiner*—Robert B. Davis
(74) *Attorney, Agent, or Firm*—Harness, Dickey & Pierce, P.L.C.

(57) ABSTRACT

An encapsulation machine utilizes servo-driven components and a control system to control the encapsulation machine. Servomotors drive the fill supply mechanism, the die rollers and the casting drums. The control system uses a programmable controller to establish relationships between the servo and non-servo-driven components of the machine and a virtual gear to facilitate and automate the operation of the encapsulation machine.

39 Claims, 16 Drawing Sheets

U.S. PATENT DOCUMENTS

2003/0084641 A1 5/2003 Tanner et al.
2003/0085487 A1 5/2003 Tanner et al.
2003/0127760 A1 7/2003 Schurig et al.

* cited by examiner

SERVO CONTROL FOR CAPSULE MAKING MACHINE

BACKGROUND AND SUMMARY OF THE INVENTION

The present invention relates to encapsulation machines and, more particularly, to soft encapsulation machines which make soft gelatin and non-gelatin capsules.

Typical soft encapsulation machines form at least two flexible gelatin sheets or ribbons by cooling molten gelatin on separate drums then lubricating and guiding the sheets into communication with each other over co-acting dies while simultaneously dispensing a desired quantity of fill material between the sheets in synch with cavities in the outer surfaces of the dies to produce soft capsules. The encapsulation machines typically utilize gearing to control the relative rotations of the various components and fill mechanisms to synchronize the operation of these various components. The synchronization of these various components, however, can vary depending upon a variety of factors, such as the particular dies used, the number of cavities and the size of the cavities on the dies, and the type of material used to form the sheets. To change the synchronization of the various components, mechanical gears are required to be changed to obtain the desired ratios and synchronization of these components. The changing of gears, however, is time intensive. Additionally, the use of mechanical gears provides finite gear ratios which limit the synchronization of the various components to the mechanical gears that are available. Thus, it would be advantageous to provide a capsule machine wherein the synchronization and rates at which the various components operate can be altered without the necessity of changing gears. Additionally, it would be advantageous if the synchronization between the various components can be infinite to thereby allow more precise synchronization between the various components. It would also be advantageous to allow various components, such as the fill mechanism, to be adjusted independently of the other components while the machine is running to allow for adjustments of the timing of fill material inserted into each of the soft capsules.

During the operation of the capsule making machine, the contact between the adjacent dies can be adjusted by the operator of the capsule making machine. Typically, the operator is able to move one of the dies closer to the other die so that the pressure or force exerted on the sheets passing between the adjacent dies can be adjusted. Such adjustments, typically are mechanical adjustments made by fluid actuators, such as pneumatic cylinders. The operator is able to adjust the pneumatic pressure thereby altering the force the dies exert on one another and on the sheets. This adjustability allows an operator to customize the pressure to ensure that quality soft capsules are produced. However, the dies are susceptible to premature failure and/or wear when the pressure or force between the two dies is more than that required to produce acceptable soft capsules. Thus, it would be advantageous to monitor/record the pressure applied to the dies so that quality capsules are produced without inducing excessive wear or premature wear on the dies.

A material fill mechanism is used to supply the fill material that is encapsulated within the soft capsules. When the fill material is a liquid, such as a liquid medication or dye for a paint ball capsule, the fill mechanism includes a plurality of positive displacement plunger-type pumps that are arranged in a housing above the dies. The plunger-type pumps are positioned on a yoke that moves linearly in a reciprocating motion to allow the plunger-type pump to fill with the liquid fill material on one stroke and subsequently discharge the liquid fill material on the other stroke. A valving arrangement between opposing pumps is utilized to control the discharge and filling of the pumps. The valve arrangement includes a sliding member that moves linearly back and forth in a direction generally perpendicular to the linear motion of the yoke. The discharge of the liquid fill material into the sheets as they are passing through the dies is coordinated with the operation of the dies to insure that the timing of the injection of the liquid fill material is synchronized with the cavities on the dies. Typically, this synchronization has been performed through the use of mechanical gears that link the timing of the stroke to the rotation of the dies. Thus, in order to adjust the synchronization a mechanical gear change is required which is time consuming. Additionally, the timing is limited to a finite number of gear ratios as determined by the gears that are available. Thus, it would be advantageous to provide a fill mechanism that is synchronized with the dies without the use of a mechanical linkage. Additionally, it would be advantageous if such synchronization could be adjusted during operation of the encapsulation machine to fine tune the synchronization and the production of capsules.

The sliding member of the valving mechanism requires lubrication. Typically, the lubrication is provided by a lubricating pump with its own separate drive. However, the use of a separate drive to operate the lubricating pump adds additional complexity and components to the capsule machine. Thus, it would be advantageous if a motion of the slide member and/or the yoke could be utilized to drive the lubrication pump.

The pumps are typically contained within a housing that is filled with a lubricating oil that is used to lubricate the sliding member. The pumps, however, can leak around their seals and contaminate the lubricating oil with the leaking fill material. Contamination of the oil requires a time consuming and possibly difficult clean up and can cause the lubricating oil to not perform as designed thereby increasing the wear on the sliding surfaces and decreasing the life span of the sliding surfaces. Thus, it would be advantageous to capture any fill material that leaks from the pumps and deter or prevent the liquid fill material from contaminating the lubricating oil within the pump housing.

The pumps are typically driven by a drive mechanism that is also located within the pump housing. Because the drive mechanism is located in the pump housing, it is possible for liquid fill material that leaks from the pumps to contaminate not only the lubrication oil but also the drive mechanism. When switching from one fill material to another, the pump and all of the components in the pump housing are required to be thoroughly cleaned to remove all contamination. The locating of the drive mechanism within the pump housing provides additional components that must also be cleaned when changing the fill material. Thus, it would be advantageous to separate the drive mechanism from the pump housing to reduce the components that are required to be cleaned when changing fill material.

The soft capsules produced by the encapsulation machine are transported from the encapsulation machine to a dryer to additionally dry the soft capsules and to make them into final form. The soft capsules are transported from the encapsulation machine to the dryer by a conveyor that extends along the front of the encapsulation machine. The conveyor can be contaminated by the fill material during operation of the encapsulation machine. When it is desired to switch the product being produced on the encapsulation machine, the conveyor must be removed from the encapsulation machine and cleaned to remove any contaminates thereon. The conveyor is driven by a motor that is attached to the conveyor. When it is necessary to remove the conveyor for cleaning, the motor must also be taken with the conveyor which makes it more difficult to remove and transport the conveyor and requires additional time to disconnect the motor from the encapsulation machine. Thus, it would be advantageous to provide a conveyor that can be easily and quickly disconnected from the motor and removed from the encapsulation machine without the motor. The present invention provides an encapsulation machine that overcomes the above-described disadvantages of typical encapsulation machines.

An encapsulation according to the principles of the present invention utilizes servomotors to drive various components of the encapsulation machine thereby eliminating the need for mechanical gearing to synchronize these components. The eliminating of the mechanical gearing simplifies the changeover of products, reduces cost, and also promotes easier fine tuning of operation of the encapsulation machine to produce capsules.

In another aspect of the present invention, the servomotors are controlled by a programmable controller that uses a serial communication ring to communicate with these components. The use of a serial communication ring facilitates the controlling of these components while minimizing the complexity of the control system. A further aspect of the present invention provides a controller with a virtual gear to which servo-driven components are keyed. Programmed relationships are used to control and coordinate the operation of the servo-driven components. This programming is advantageous in that it allows infinite numerical relationships to be programmed between the servo-driven components and the virtual gear. The use of the virtual gear is also advantageous in that a relationship between any servo-driven component and another servo-driven component can be established and easily modified through their relationships to the virtual gear.

The controller also enables the relationship between the servo-driven components and the virtual gear to be changed on-line or during production of the capsules to fine tune the operation of the encapsulation machine. This is advantageous in that no gearing changes are needed to make adjustments to the operation of the encapsulation machine. The controller also controls the operation of other non-servo-driven components. To control the non-servo-driven components, relationships between these non-servo-driven components and the virtual gear or other operating parameters or conditions of the encapsulation machine are programmed into the controller. The controller then uses these programmed relationships to coordinate and control the operation of these non-servo-driven components. (This is advantageous in that an adjustment in one of the components, such as the die rolls, allows the controller to automatically adjust the operation of the other components based upon these programmed relationships.) In yet another aspect of the present invention, the controller also enables the monitoring and recording of the various operational parameters of the encapsulation machine. The ability to monitor and record these operational parameters is advantageous in that it can facilitate the troubleshooting of the encapsulation machine and/or monitor changes an operator of the machine is implementing during production.

An encapsulation machine according to the principles of the present invention utilizing a control system that allows programmed relationships between components of the system to be selectively engaged and disengaged and altered is provided in still another aspect of the present invention. The ability to select whether the programmed relationships are implemented or not implemented is advantageous in that it allows the programmed relationships to be suspended so that troubleshooting can occur. Additionally, the ability to adjust the programmed relationships during operation of the machine is advantageous in that it easily allows the determination of ideal operating parameters for new fill material or new products being produced therein without requiring gear changes or alterations to the mechanical linkages during the establishment of operating parameters.

In another aspect of the present invention an encapsulation machine according to the principles of the present invention utilizes separate drive and pump housings that contain a respective drive mechanism and a pump assembly. The separation of the drive mechanism and pump assembly within different housings is advantageous in that if the pump assembly leaks fill material, the fill material does not contaminate the drive mechanism and drive housing, thus, enabling a simpler changeover between fill material by requiring less components to be cleaned. Additionally, in a further aspect of the present invention the pump assembly utilizes a tray beneath the pump assembly to capture fill material that may leak from the pumps and deters that fill material from contaminating lubricant within the pump housing.

Another aspect of the present invention includes an encapsulation machine according to the principles of the present invention which uses the motion of the pump assembly to drive a lubricating pump supplying a lubricating fluid thereto. The use of the motion of the pump assembly to drive a lubricating pump is advantageous in that it eliminates the need for a separate drive for a lubricating pump.

Another aspect of the present invention includes an encapsulation machine according to the principles of the present invention which uses a conveyor that can be quickly and easily decoupled from a motor driving the conveyor. The quick coupling and decoupling of the conveyor is advantageous in that it allows the conveyor to be easily and quickly removed from the encapsulation machine for cleaning without the necessity of taking a cumbersome motor with the conveyor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
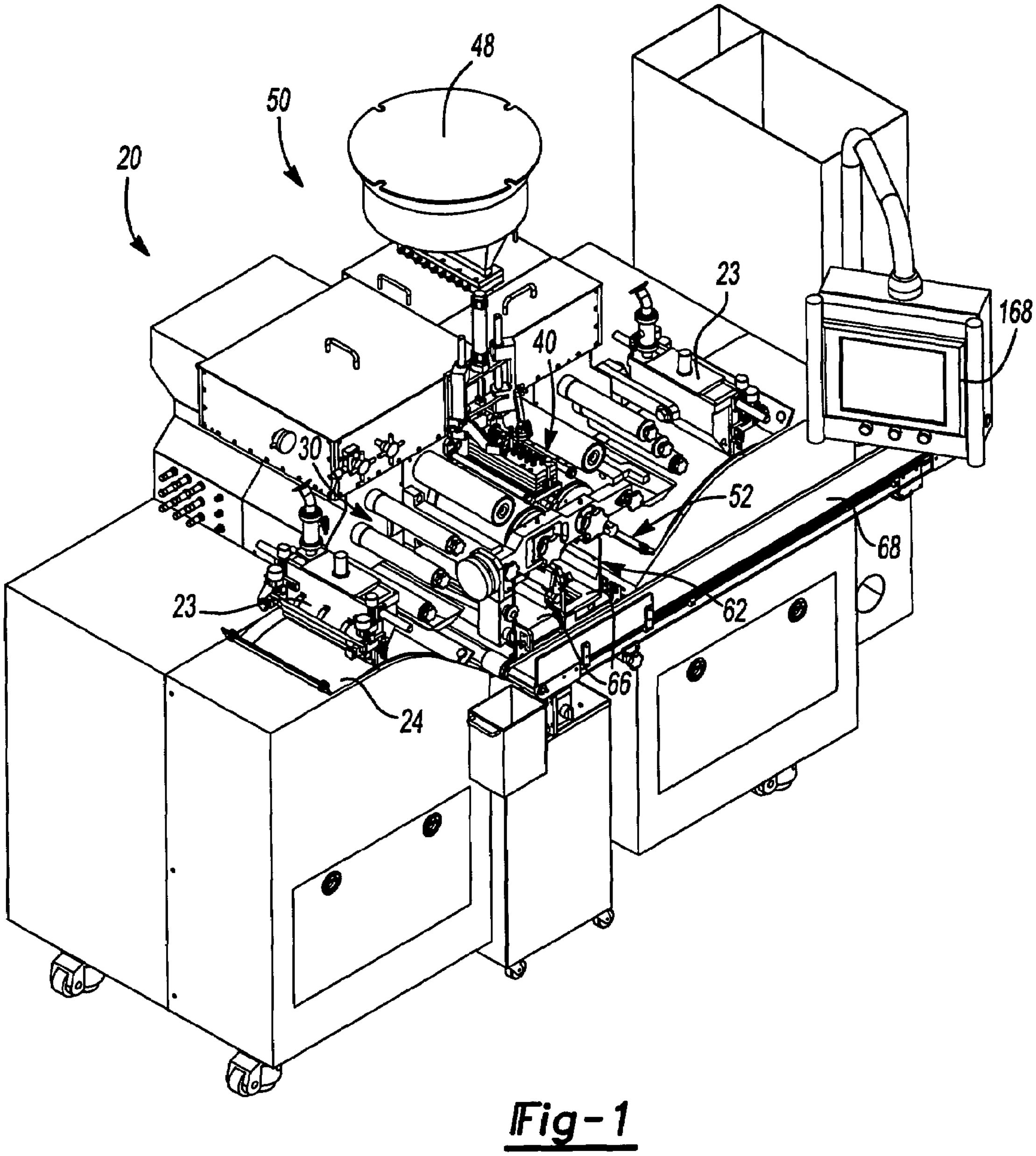
FIG. 1 is a perspective view of a front side of an encapsulation machine according to the principles of the present invention.
Figure 2:
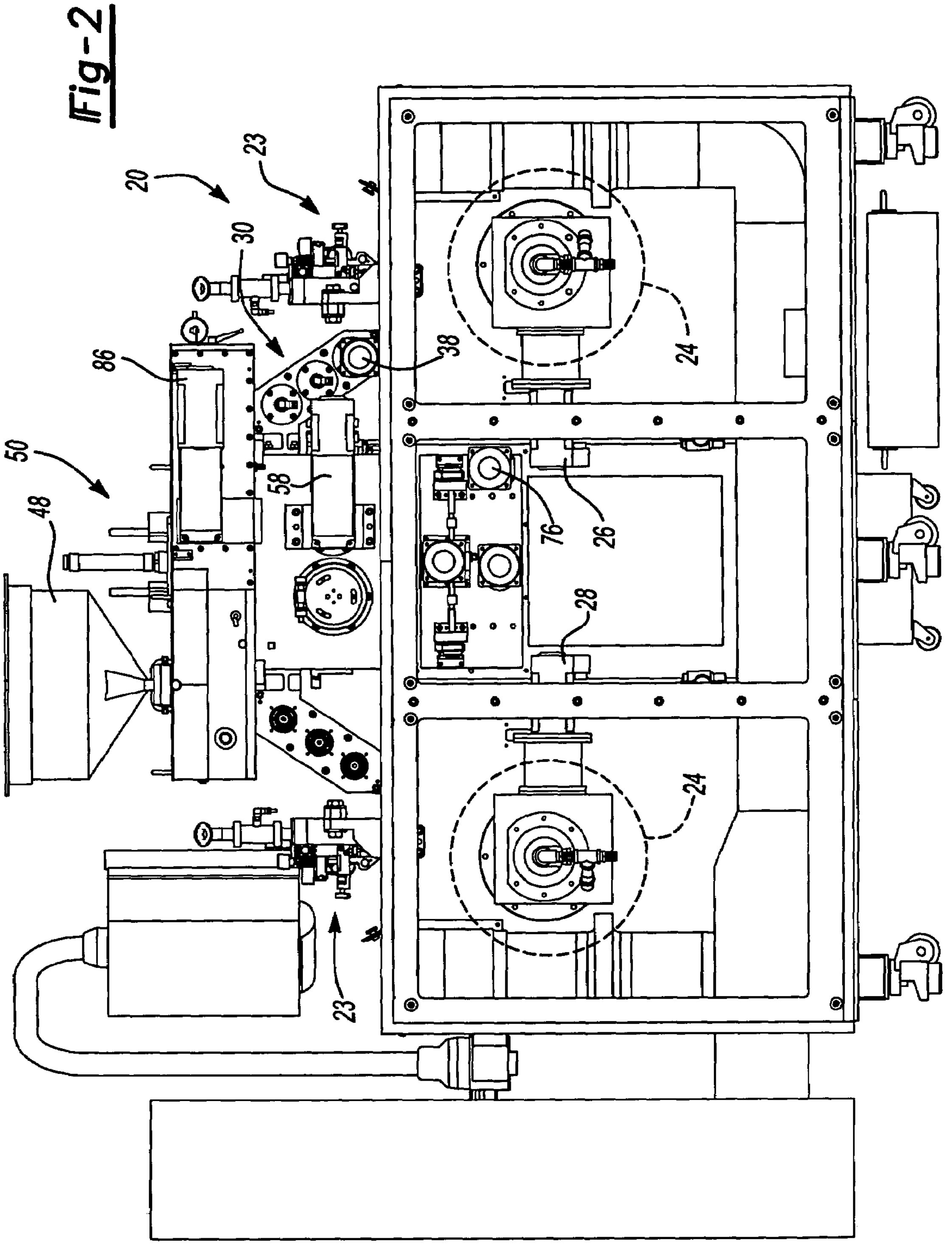
FIG. 2 is an elevation view of the rear side of the encapsulation machine of FIG. 1 with the rear cover removed.
Figure 3:
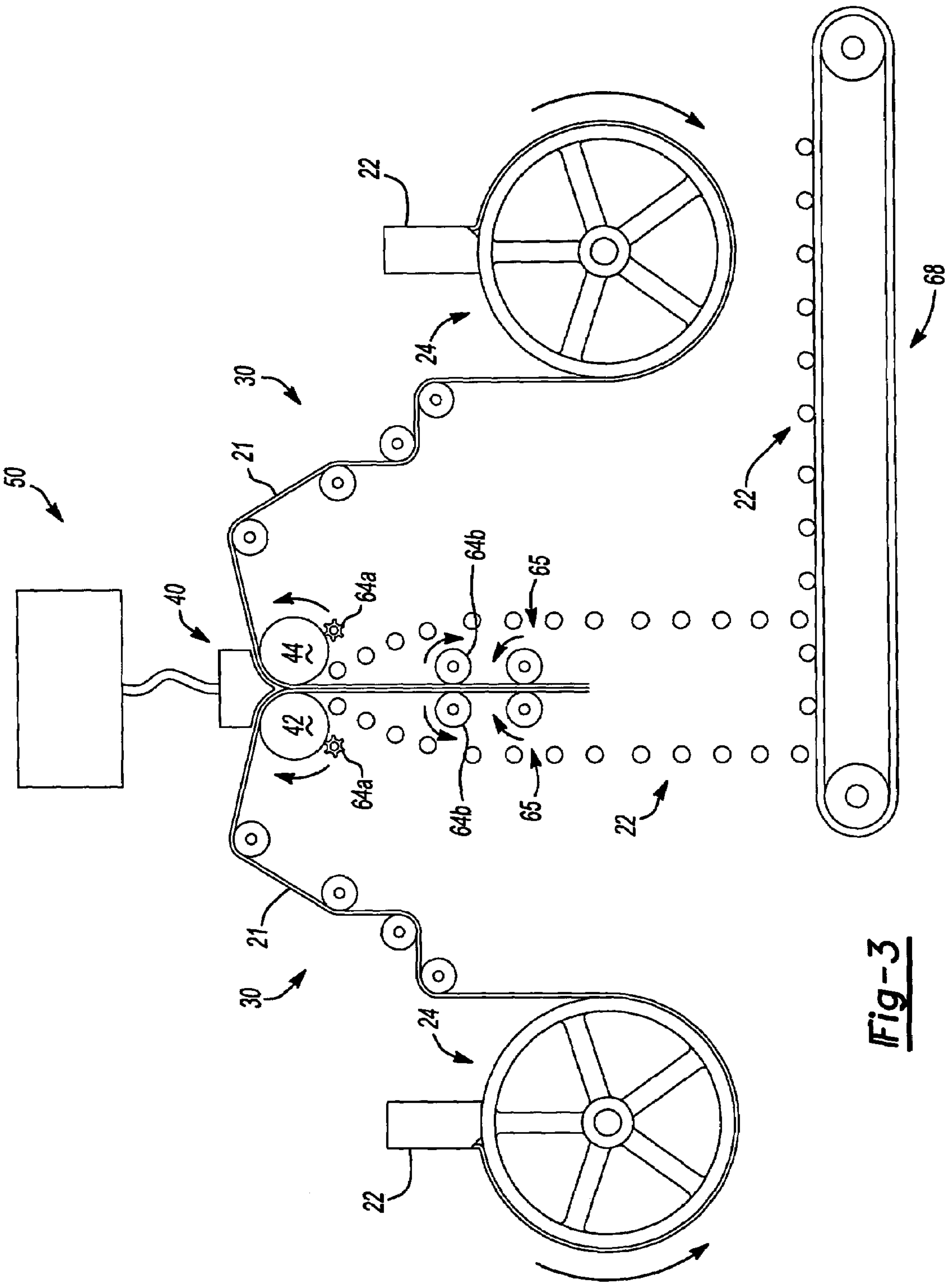
FIG. 3 is a schematic representation of a portion of the encapsulation machine of FIG. 1.

A soft gel encapsulation machine 20 according to the principles of the present invention is shown in FIGS. 1 and 2 while a schematic representation of a portion of encapsulation 20 is shown in FIG. 3. Encapsulation machine 20 is operable to produce soft gel capsules with a fill material therein. In this particular embodiment the fill materials are liquid. It should be appreciated, however, that other types of fill material, such as solid suspensions, can also be encapsulated within a soft gel capsule with encapsulation machine 20 without departing from the spirit and scope of the present invention. The soft gel capsules produced by encapsulation machine 20 can be used for a variety of purposes. For example, the fill material can be a medicine and the soft capsules used to administer the medicine, and the fill material can be a paint or dye substance and the soft gel capsules used in a paint ball gun or similar type applications.

Figure 4:
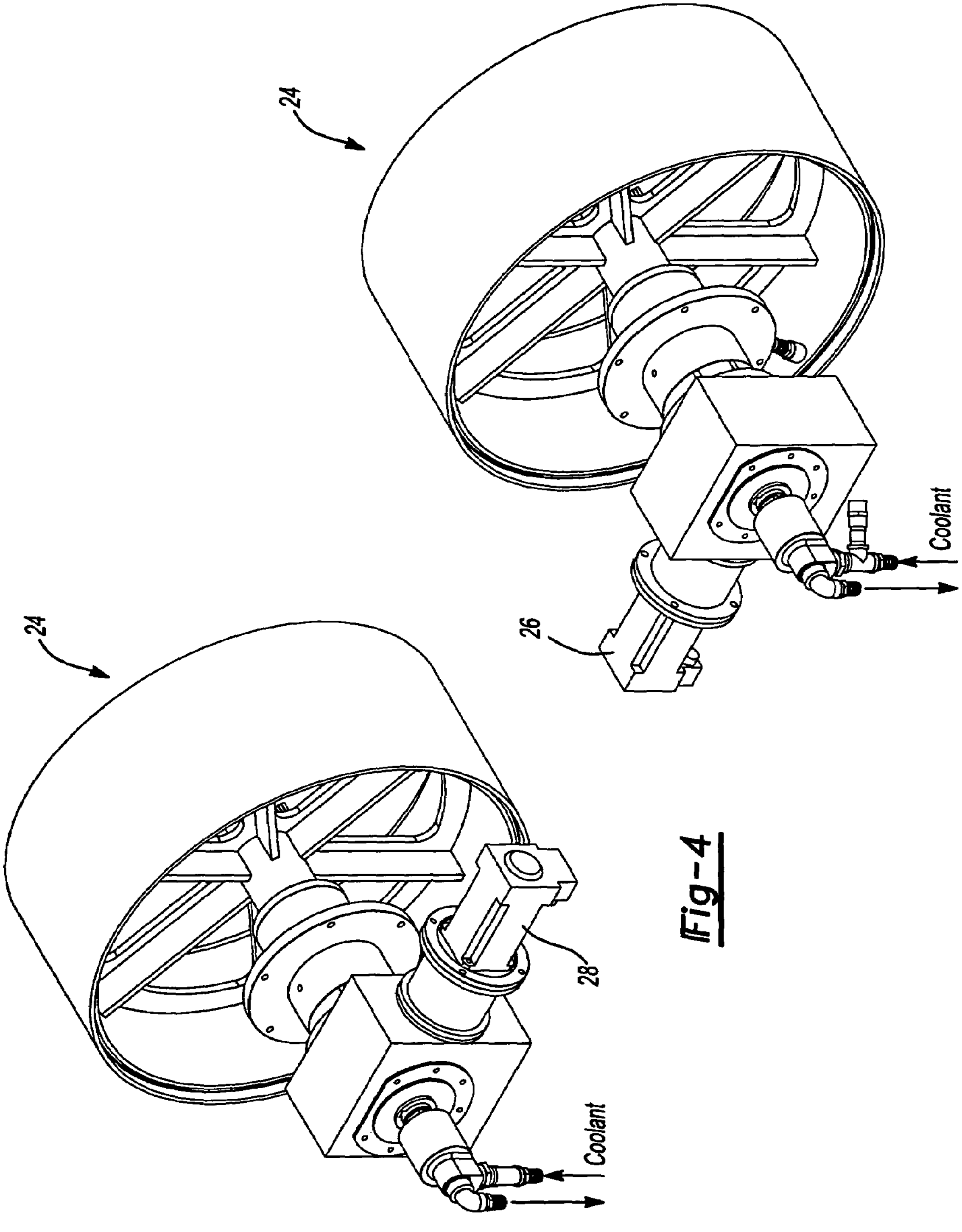
FIG. 4 is a perspective view of the rear side of the pair of casting drums used in the encapsulation machine of FIG. 1.

Encapsulation machine 20 produces two continuous flexible gelatin films/sheets/ribbons 21 on either side of the machine that are subsequently joined together with a fill material injected therebetween to form the soft gel capsules 22. The production of the two gelatin films are substantially the same for both sides of encapsulation machine 20 and are essentially mirror images of one another. A gelatin tank (not shown) provides a gelatin in a molten state that is fed through hoses (not shown) into spreader boxes 23 that are located above casting drums 24. Spreader boxes 23 spread molten gelatin on rotating casting drums 24. Casting drums 24, as shown in FIG. 4, are internally liquid cooled and are externally air cooled. The cooling causes the molten gelatin that is spread on casting drums 24 to solidify and form flexible gelatin sheets 21. Each casting drum 24 produces a continuous flexible gelatin sheet that is used to form a portion of each capsule. Each of the casting drums 24 are driven by a servomotor 26, 28 which provide precise control of the rotation of casting drums 24, as discussed in more detail below.

Figure 5:
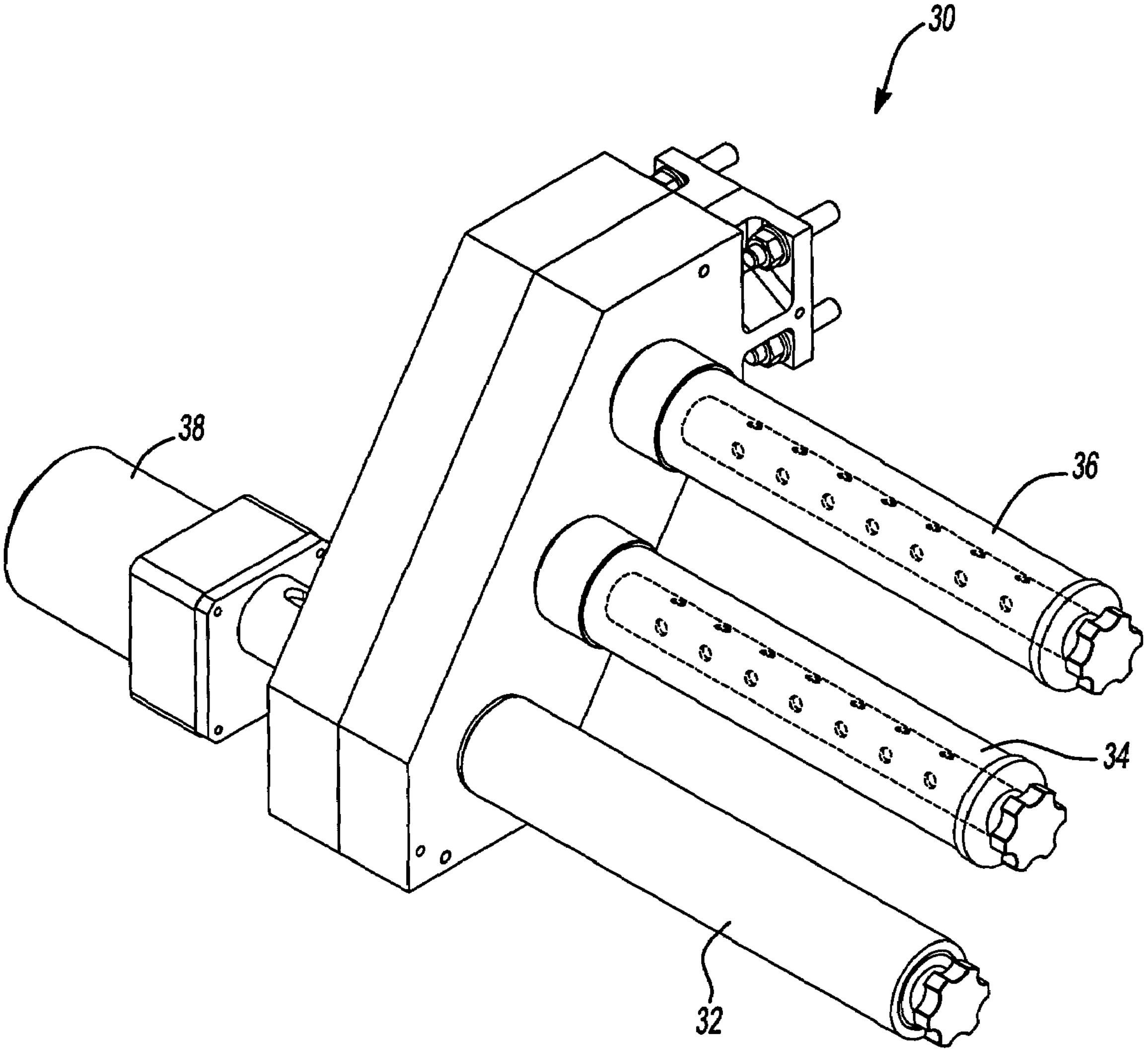
FIG. 5 is a perspective view of an oil roll assembly used in the encapsulation machine of FIG. 1.

The gelatin sheets formed on casting drums 24 flow through oil roller assemblies 30, best seen in FIGS. 1, 3 and 5. The oil roller assemblies include three rollers, 32, 34, 36. First roller 32 is driven by a variable speed motor 38 which is operated to cause first roller 32 to rotate at a desired rate. Second and third rollers 34, 36 are mechanically linked to first roller 32 and, thus, their rate of rotation is also controlled by the rate rotation of first roller 32. One side of the gelatin sheet is in contact with second roller 34 while the opposite side of the gelatin sheet is in contact with third roller 36. Second and third rollers 34, 36 each have a plurality of openings therein that allow an oil or lubricant to be applied to both sides of the gelatin sheet as it passes along the rollers.

Figure 6:
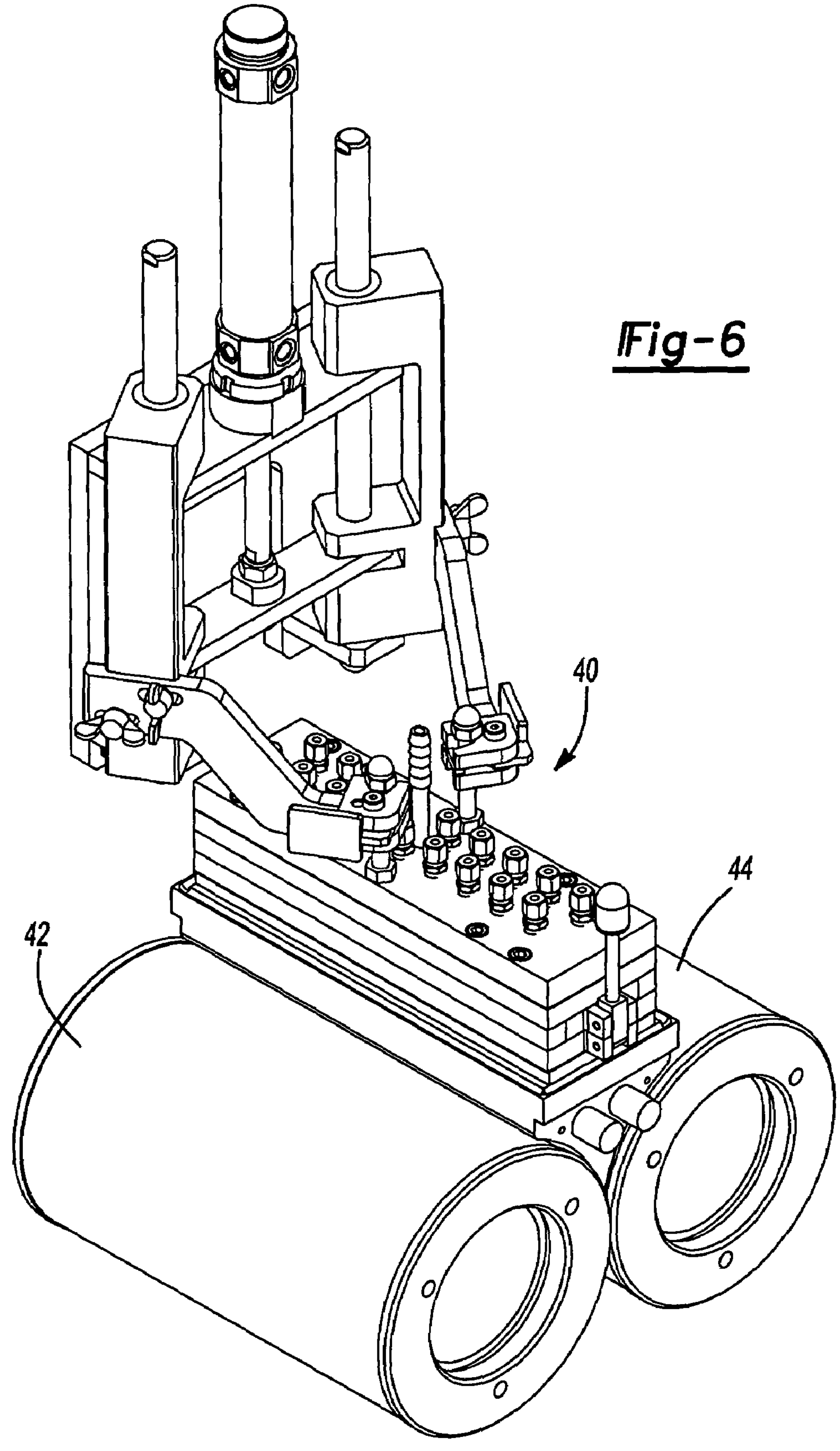
FIG. 6 is a perspective view of a pair of die rolls and a wedge assembly used in the encapsulation machine of FIG. 1.

The two gelatin sheets flow into contact with wedge assembly 40, best seen in FIGS. 3, 5 and 6, and then through co-acting dies 42, 44. Wedge assembly 40 heats the sheets and supplies the fill material between the two gelatin sheets that is encapsulated within the soft gel capsules produced by dies 42, 44. The fill material is supplied to wedge assembly 40 from a fill mechanism 50, shown in FIGS. 1, 2 and 9. Fill supply mechanism 50 includes a fill material hopper 48 (FIGS. 1 and 2) that supplies the fill material to a pump assembly, described in more detail below.

Figure 7:
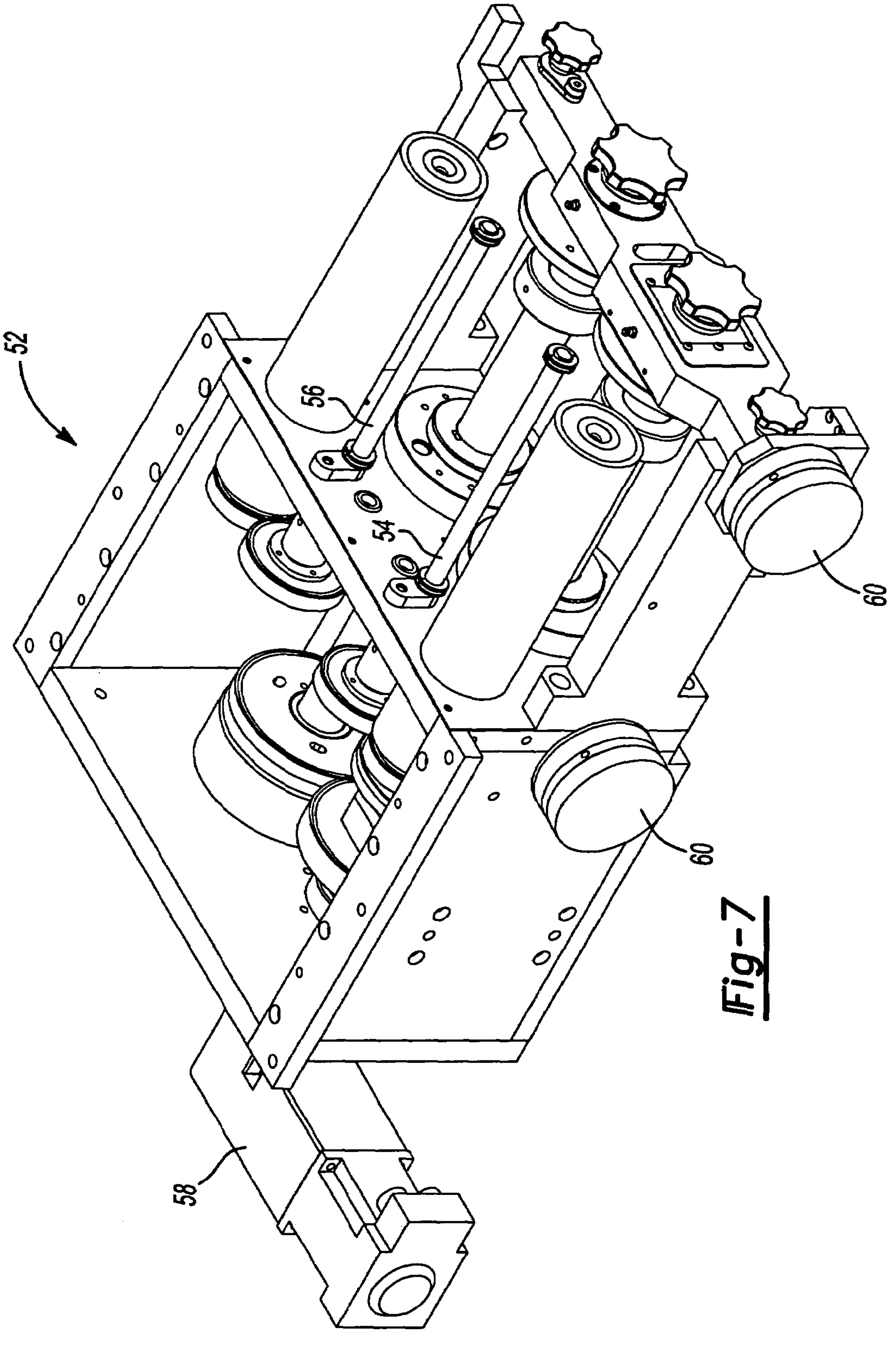
FIG. 7 is a perspective view of a die roll housing assembly used in the encapsulation machine of FIG. 1 with the die rolls removed.

The two gelatin sheets travel between wedge assembly 40 and die assembly 52 and fill material is injected between the sheets by wedge assembly 40, shown in FIGS. 3, 6 and 7. Die assembly 52 is shown with dies 42, 44 removed therefrom. Dies 42, 44 mount on die shafts 54, 56 respectively. Dies 42, 44 are driven by die shafts 54, 56 to rotate toward one another when producing soft gel capsules. Die shaft 54 (die 42) is driven by a servomotor 58. The other die shaft 56 (die 44) is mechanically linked to die shaft 54 so that rotation of die 42 and die shaft 54 causes rotation of die 44 and die shaft 56. The mechanical link between dies 42 and 44 provides synchronization of the two dies relative to one another during operation. The use of a mechanical linkage is advantageous in that it eliminates the need for another costly servomotor to drive the other die and the potential for non-synchronized operation due to programming or operator errors. Servomotor 58 enables precise control of the rate of rotation of dies 42, 44 and of the exact position of dies 42, 44 at all times, as discussed in more detail below. Each die 42, 44 has a plurality of cavities thereon (not shown) that the gelatin sheets are pushed into by the fill material and cause the two sheets to be sealed together and cut along the cavities on the dies 42, 44 encapsulating the fill material therein and forming the soft gel capsules. The pressure between dies 42, 44 is pneumatically controlled by pneumatic cylinders 60 which are controlled by a regulator (not shown). The regulator is a proportional pressure regulator with a switching valve, such as those available from Festo Corporation. By adjusting the pressure in pneumatic cylinder 60, the force dies 42, 44 apply to one another can be adjusted during operation of encapsulation machine 20 to a pressure that provides for production of soft gel capsules meeting the product specifications.

The soft gel capsules produced between dies 42, 44 and the remaining gelatin sheets flow to a divider assembly 62, best seen in FIGS. 1 and 3. Divider assembly 62 includes a first pair of stripper rollers 64*a* that rotate at a relatively high speed very close to dies 42, 44 and a second pair of stripper rollers 64*b* that rotate at a relatively high speed in contact with the sheets to remove any soft gel capsules that are clinging to dies 42, 44 and/or the gelatin sheets. The soft gel capsules then fall onto conveyors 66 that bring the soft gel capsules to the front portion of the machine and onto a second conveyor 68, which is described below. The stripper rollers 64*a*, 64*b* are driven by a variable speed motor (not shown) that allows the speed of stripper rollers 64*a*, 64*b* to be controlled.

The gelatin sheets, after passing along the stripper rollers 64*a*, 64*b* flow into a mangle roller assembly 65, shown in FIG. 3 only, wherein a pair of mangle rolls pull on the gelatin sheets and provide tension thereon. The mangle rollers are driven by a variable speed motor (not shown) so that the speed of rotation of the mangle rollers can be adjusted. The mangle rollers are operated to provide a desired amount of tension in the gelatin sheets throughout the encapsulation machine 20.

Figure 8:
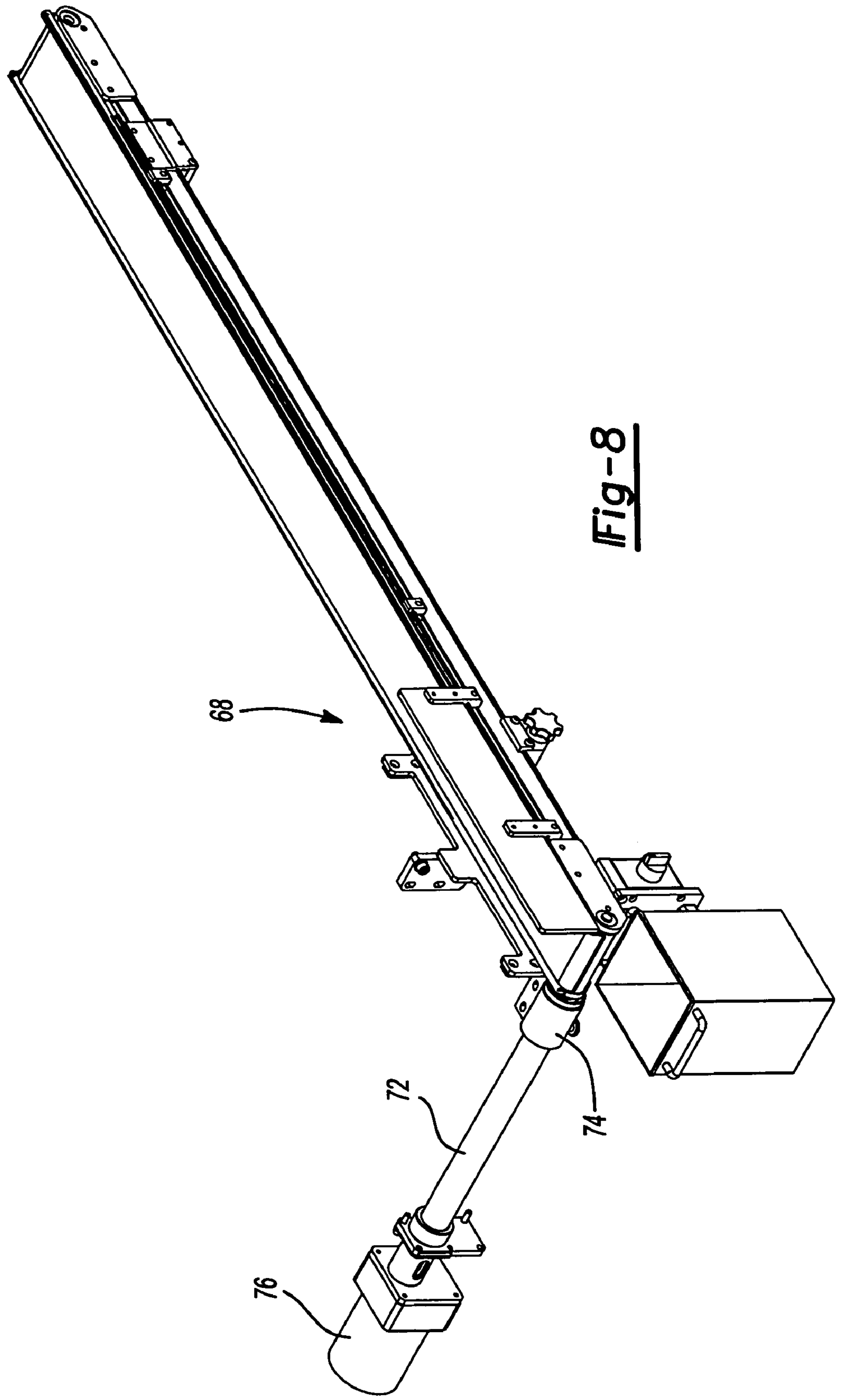
FIG. 8 is a perspective view of a transport conveyor used in the encapsulation machine of FIG. 1.

As stated above, the soft gel capsules produced in encapsulation machine 20 are transported to a conveyor 68 that runs along the front of encapsulation machine 20. Conveyor 68 transports the soft gel capsules to a dryer or similar type device for drying the soft gel capsules. Conveyor 68, as shown in FIG. 8, is coupled to a shaft 72 by a coupler 74. Shaft 72 is coupled to a motor 76 which is located inside machine 20, as sown in FIG. 2. Coupler 74 is operable to couple conveyor 68 to shaft 72 and to motor 76, which drives conveyor 68. Coupler 74 is easily coupled and un-coupled from shaft 72. The easy coupling of conveyor 68 to motor 76 allows conveyor 68 to be removed from encapsulation machine 20 without the necessity of removing motor 76. Thus, when it is necessary to clean conveyor 68, the conveyor can be de-coupled from motor 76, thereby facilitating easy removal of conveyor 68 and subsequent cleaning.

Figure 9:
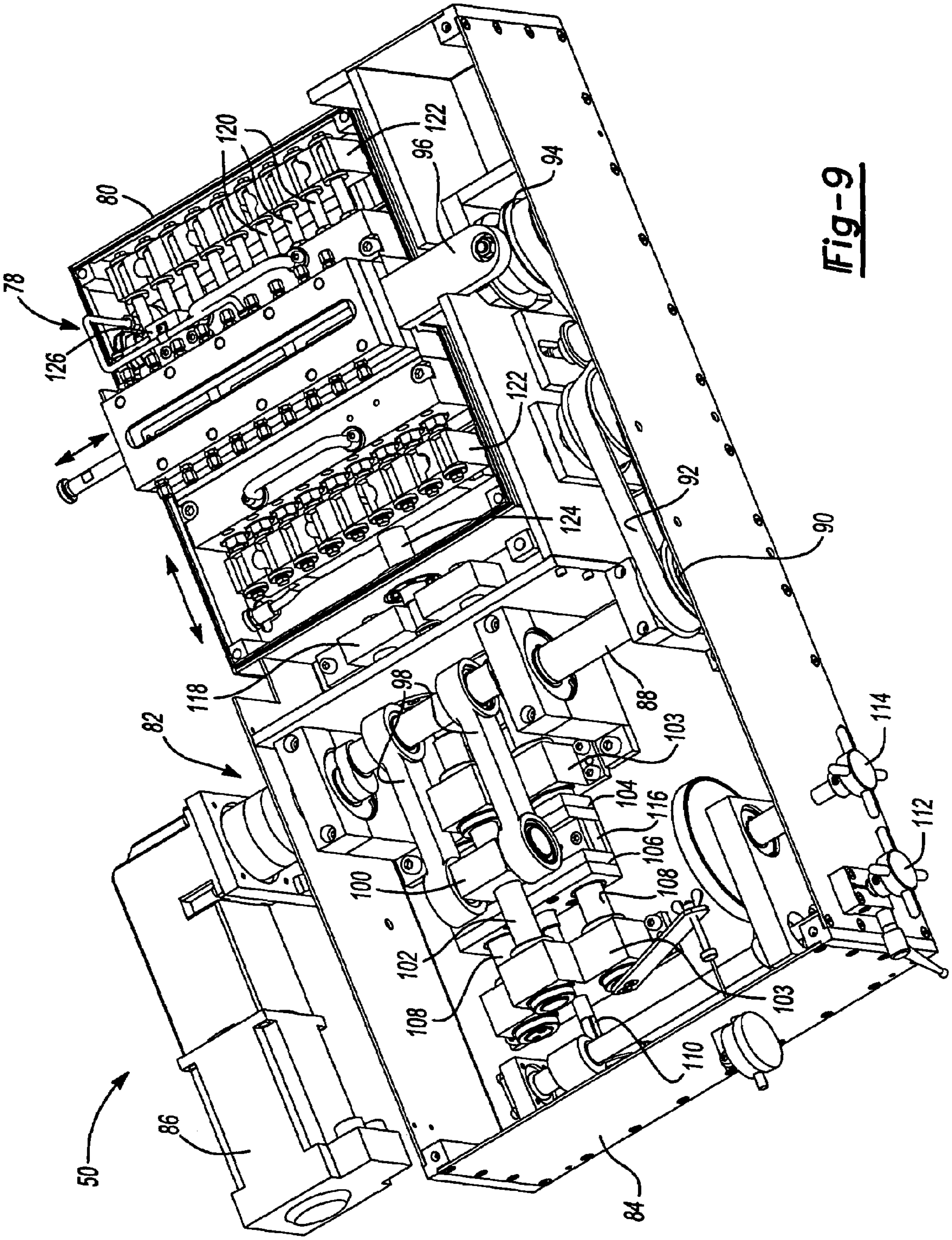
FIG. 9 is a perspective view of the fill mechanism used on the encapsulation machine of FIG. 1 with the top cover removed.
Figure 10:
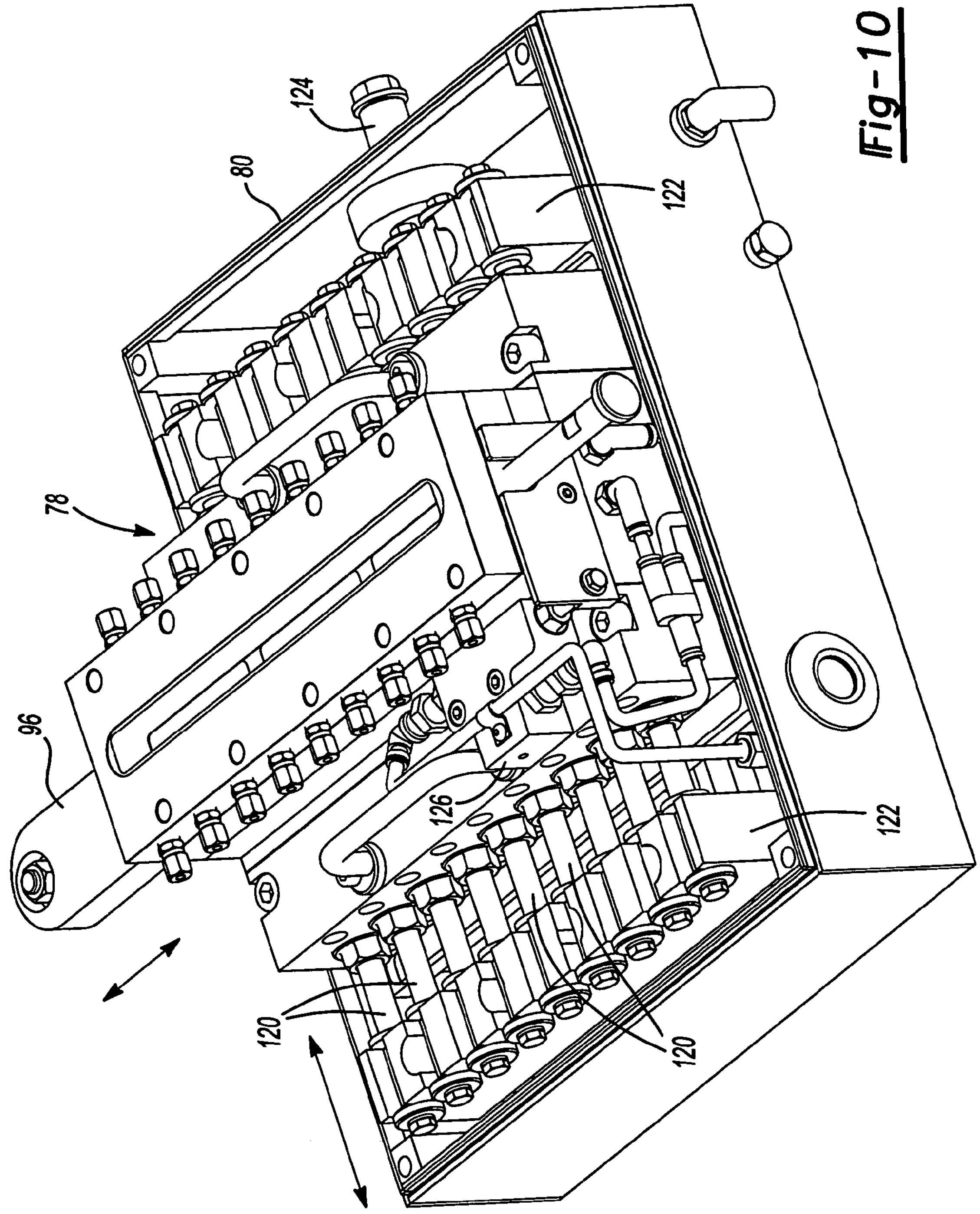
FIG. 10 is a perspective view of the pump assembly of the fill material mechanism of FIG. 9.

Referring now to FIG. 9, fill supply mechanism 50 is shown with two covers removed. Fill supply mechanism 50 includes a pump assembly 78 contained within a pump housing 80, as shown in FIG. 10, and a drive mechanism 82 operable to drive pump assembly 78. Drive mechanism 82 is contained within a separate drive mechanism housing 84 that is distinct and separate from pump housing 80. The separating of drive mechanism 82 from pump assembly 78 by discreet drive mechanism and pump housings 84, 80 prevents fill material that may leak from pump assembly 78 within pump housing 80 from contaminating drive mechanism 82 and drive mechanism housing 84. This separation also enables a changeover in fill material without requiring cleaning of drive mechanism 82 and drive mechanism housing 84.

Drive mechanism 82 is operable to cause reciprocating motion in pump assembly 78 in two directions that are generally orthogonal to one another, as indicated by the double-headed arrows shown in FIG. 9. Drive mechanism 82 is driven by a servomotor 86 that allows precise control of the speed at which drive mechanism 82 is operated and the position of drive mechanism 82, as discussed below. Servomotor 86 enables synchronization of fill mechanism 50 with other components, such as dies 42, 44 without mechanical linkages or gears.

Servomotor 86 rotates a crank shaft 88. One end of crank shaft 88 is coupled to a pulley 90 which drives a belt 92 which is coupled to and rotates a cam pulley 94. Cam pulley 94 has a slot therein with two distinct positions and transitions therebetween. Rotation of cam pulley 94 causes a slide valve 96 on pump assembly 78 to move back and forth in reciprocating motion, thus imparting one of the linear motions to pump assembly 78. An intermediate portion of crankshaft 88 is coupled to a pair of connecting rods 98 and causes connecting rods 98 to reciprocate back and forth between two extreme positions. An upper drive block 100 is coupled to the opposite end of connecting rods 98 and is fixedly attached to an upper guide shaft 102 that is moveably supported within stationary guides 103. Upper drive block 100 and upper guide shaft 102 move linearly with movement of connecting rods 98 between the two extreme positions. Upper driving block 100 is positioned between a pair of spaced apart stroke blocks 104, 106. Stroke blocks 104, 106 are slidably attached to a pair of spaced apart drive shafts 108 which are moveably supported within stationary guides 103. The distance between the first stroke block 104 and the second stroke block 106 is as adjustable by rotation of a spacing shaft 110. Specifically, a portion of spacing shaft 110 has right hand threads while a different portion has left hand threads and stroke blocks 104, 106 have complementary threaded openings and are positioned on these different portions so that rotation of spacing shaft 110 causes the distance between stroke bocks 104, 106 to change. Spacing shaft 110 is moveably (rotationally and linearly) supported within stationary guides 103. Rotation of spacing shaft 110 is driven by a pair of adjustment handles 112, 114. First adjustment handle 112 is used for coarse or gross adjustments of the spacing between stroke blocks 104, 106. That is, rotation of adjustment handle 112 causes large changes in the distance between stroke blocks 104, 106. Second adjustment handle 114 is for fine adjustment and rotation of adjustment handle 114 results in small changes in the distance between stroke blocks 104, 106. The use of a coarse adjustment and a fine adjustment to adjust the distance between stroke blocks 104, 106 enables the stroke of pump assembly 78 to be adjusted. By adjusting the stroke, the quantity of fill material discharged by pump assembly 78 is adjusted. There is a lower drive block 116 that is fixedly attached to both drive shafts 108 and attached to spacing shaft 110 so that spacing shaft 110 can rotate relative to lower drive block 116 but cannot move linearly relative to lower drive block 116. This arrangement causes drive shafts 108, spacing shaft 110, lower drive block 116 and stroke blocks 104, 106 (when not being adjusted) to be linearly fixed together and move together, as described below. Lower drive block 116 is located between stroke blocks 104,106. The ends of drive shafts 108 extend out of drive mechanism housing 84 and are attached to a coupler 118. Coupler 118 couples to pump assembly 78 to cause reciprocal motion of the plunger pumps within pump assembly 78, as described below.

In operation, servomotor 86 causes crankshaft 88 to rotate. The rotation of crankshaft 88 causes connecting rods 98 to move back and forth between two extreme positions. The movement of connecting rods 98 cause upper drive block 100 and upper guide shaft 102 to also move back and forth between two extreme positions. During motion in one direction (to the left in FIG. 9), upper drive block 100 will contact stroke block 106 causing both stroke blocks 104, 106, spacing shaft 110, lower drive block 116 and drive shafts 108 to move linearly to the left (FIG. 9) until upper drive block 100 reaches its extreme left (in FIG. 9) position. Upper drive block 100 and upper guide shaft 102 then begin movement towards the other extreme position (to the right in FIG. 9) and this movement will eventually cause upper guide block 100 to contact stroke block 104. Continued movement of upper drive block 100 causes stroke blocks 104, 106, spacing shaft 110, lower drive block 116 and drive shafts 108 to move linearly to the right (in FIG. 9) until upper drive block 100 reaches its other (right in FIG. 9) extreme position. The process then begins again as upper drive block 100 moves back towards its previous extreme position. By adjusting the distance between stroke blocks 104, 106, the distance spacing shaft 110, lower drive block 116 and drive shafts 108 are moved as a result of the motion of upper drive block 100 between its extreme positions it adjusted. This stroke adjustment allows the linear motion imparted to pump assembly 78 via coupler 118 to also be adjusted to provide a desired stroke for pump assembly 78. Thus, rotation of servomotor 86 causes drive mechanism 82 to impart both an adjustable stroke motion to pump assembly 78 via coupler 118 and a fixed linear motion to slide valve 96.

Referring now to FIG. 10, pump assembly 78 includes a plurality of opposing positive displacement plunger-type pumps 120. The plungers of pumps 120 are attached to a pair of opposing yokes 122. Yokes 122 move in a reciprocating motion and are driven by coupler 118 via a yoke shaft 124. Thus, reciprocating motion of coupler 118 is translated into reciprocating motion of the plungers of pumps 120. The reciprocating motion of pumps 120 cause fill material to be either sucked into pump 120 or injected from pump 120 to wedge assembly 40 depending upon which direction yoke 122 is moving.

Figure 11:
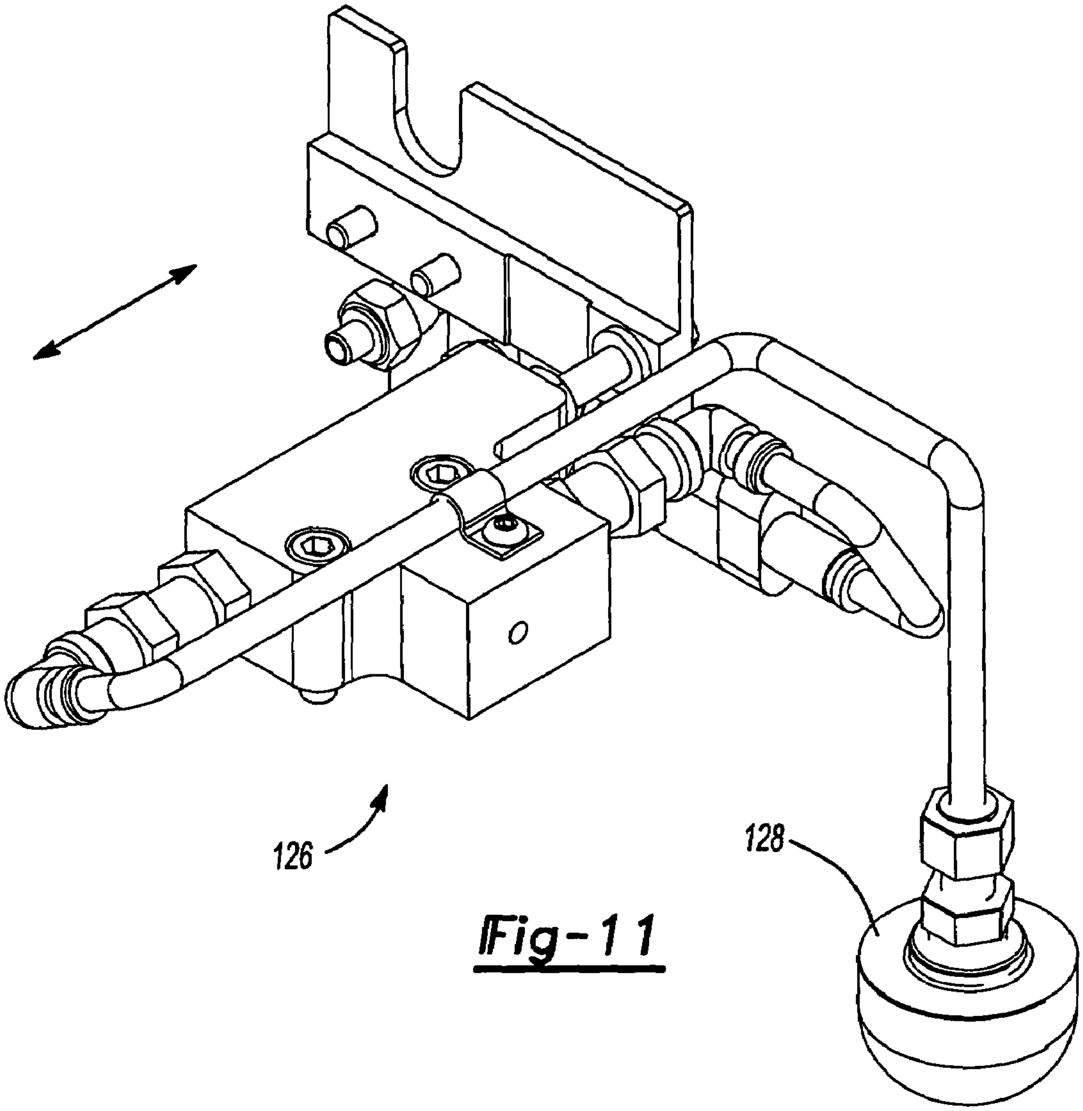
FIG. 11 is a perspective view of the lubrication pump used on the pump assembly of FIG. 10.

Slide valve 96 controls the communication between the individual pumps 120 and the fill material contained in hopper 48. As slide valve 96 moves from one extreme position to the other, some of the pumps 120 will be in communication with the fill material in hopper 48 and suck the fill material in while the other pumps 120 will be in communication with wedge assembly 40 and inject the fill material therein to wedge assembly 40 and form the capsules. Slide valve 96 is supplied a lubricant by a lubricant pump 126, as shown in FIGS. 9-11. Lubricant pump 126 is a positive displacement plunger-type pump and is coupled to slide valve 96. The reciprocating motion of slide valve 96 causes lubricant pump 126 to suck lubricant from the lower portion of pump housing 80 via a strainer and tube 128 and to inject the lubricant into the appropriate locations to lubricate and facilitate movement of slide valve 96. Thus, the motion of slide valve 96 operates lubricant pump 126 to lubricate slide valve 96 and avoids the necessity of having a separate drive mechanism or motor for lubricant pump 126. It should be appreciated that lubrication pump 126 could alternately be driven off the reciprocating motion of yokes 122 although all of the benefits may not be realized due to the variable nature of the stroke of yokes 122.

Figure 12:
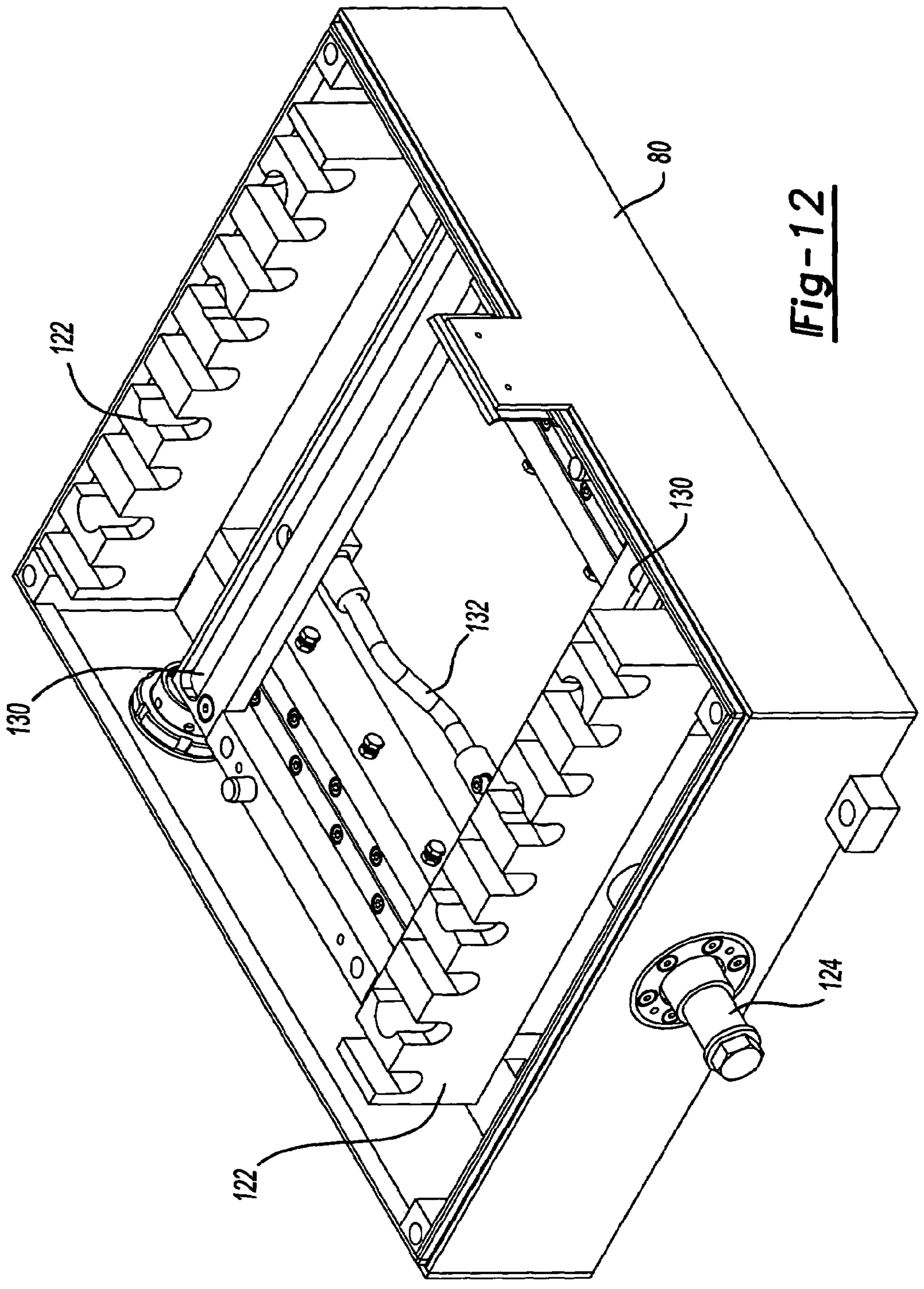
FIG. 12 is a perspective view of the pump assembly housing of FIG. 11 with the pumps removed.

To avoid contamination of the lubricant within pump housing 80 by a leaking pump 120, a pair of catch trays 130, as shown in FIG. 12, are positioned beneath the seals in pumps 120 where the plungers move in and out. Trays 130 catch fill material that leaks from the plungers on pumps 120 and directs them to a catch hopper (not shown) via a drain hose 132. The use of trays 130 deters fill material that leaks from pumps 120 from contaminating the lubricant within pump housing 80. By avoiding contamination of the lubricant, the service life of the pump is improved and minimizes the contamination of the components within pump housing 80 by the fill material.

Figure 13:
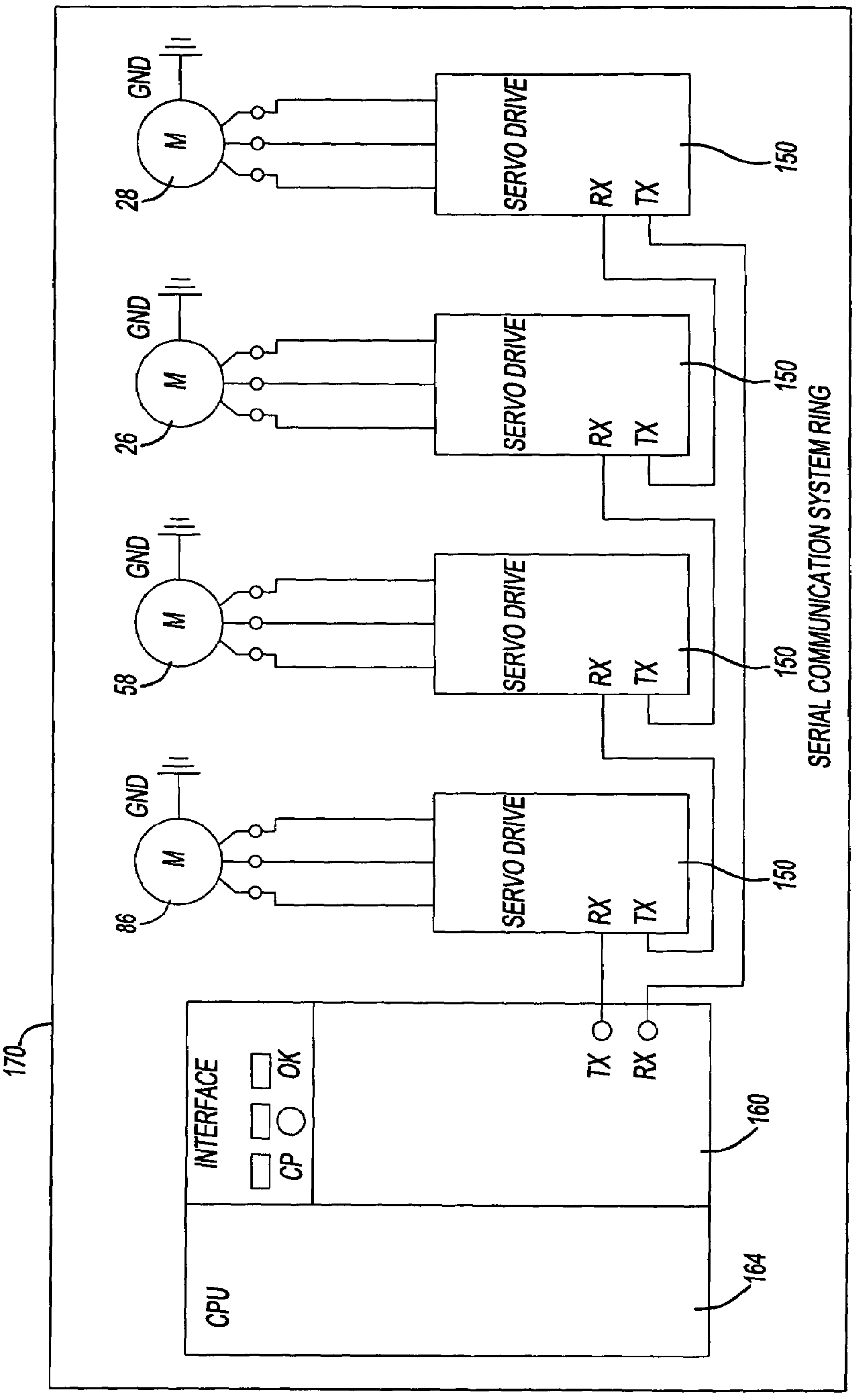
FIG. 13 is a schematic presentation of the sercos system configuration for controlling the various servo-driven motors on the encapsulation machine of FIG. 1.

As stated above, one of the die rolls 42 or 44, each casting drum 24 and pump assembly 78 are driven by respective servomotors 58, 26, 28 and 86. The servomotors 58 and 86 driving one of the die rolls 42 or 44 and pump assembly 78 provide a feedback that enables a closed-loop control which provides precise control of the rate of rotation and position of the components associated with the servomotors. With the dies being mechanically linked and one of the dies being driven by servomotor 58, both dies 42, 44 can be precisely controlled by servomotor 58. The exact position of casting drums 24 are not needed. As such, the servomotors 26, 28 driving casting drums 24 provide a feedback that enables a closed-loop control which provides precise control of the rate of rotation but not the position of casting drums 24. A variety of servomotors are available that can be used with encapsulation machine 20, such as those available from Allen-Bradley. Each servomotor 26, 28, 58 and 86 is connected to an associated servo drive 150, as shown in FIG. 13. Suitable servo drives 150 are available from Allen-Bradley. The servo drives 150 are linked together with a fiber optic cable as part of a serial communication system ring. The serial communication ring is connected to an interface 160. Interface 160 communicates with a central processing unit (CPU) 164. CPU 164 is an electronic programmable controller and uses programmable logic control (PLC) to control operation of encapsulation machine 20. A suitable interface 160 and CPU 164 are available from Allen-Bradley.

CPU 164 also controls the operation of the other components of encapsulation machine 20. For example, CPU 164 controls the operation of the variable speed motor 38 of each oil roller assembly 30, the two oil pumps in each oil roller assembly 30, variable speed motors of stripper rollers 64*a* and 64*b*, the variable speed motor driving the mangle rollers 65, the variable speed motors driving conveyors 66, 68, level of the gelatin in spreader boxes 23, wedge assembly 40 and the remaining components of encapsulation machine 20. These connections between CPU 164 and these components are not shown in FIG. 13. The variable speed motors and pumps controlled by CPU 164 use open loop control. Closed loop control, however, could be used if desired. An operator of encapsulation machine 20 interfaces with CPU 164 with a touch-screen monitor 168. Monitor 168 also provides the operator of encapsulation machine 20 with useful information regarding the current operating state and allows programming of CPU 164. This overall control system will hereinafter be referred to as control system 170.

Control system 170 facilitates and controls the coordination and synchronization of the various components of encapsulation machine 20. The use of servomotors and servo drives to operate and control casting drums 24, dies 42, 44 and fill supply mechanism 50 enables significant advantages to be realized. For example, such control allows for a quicker changeover between products by not requiring the changing of mechanical gears to adjust the rates of rotations of these various components. The system also allows dynamic adjustments of these components on-line during operation of encapsulation machine 20. Additionally, more precise control of the movement of these components is achieved along with providing for infinite timing changes to be realized.

Control system 170 uses programmable logic control (PLC) to control the various components of encapsulation machine 20. Control system 170 uses a "virtual gear" or "virtual master" to control operation of encapsulation machine 20. Specifically, control system 170 electronically adjusts the operation of the various components of encapsulation machine 20 based upon programmed relationships between the various components and a virtual gear in the controller. In other words, the various components can each be slaved by its programmed relationship to the virtual gear which then provides a relationship between all of the various components.

Control system 170 allows various levels of user interface to control access to the various functionalities (both programming and operational) of control system 170. Each level of user interface allows access to specific functionalities and different users of encapsulation machine 20 will be granted different levels of access.

Figure 14:
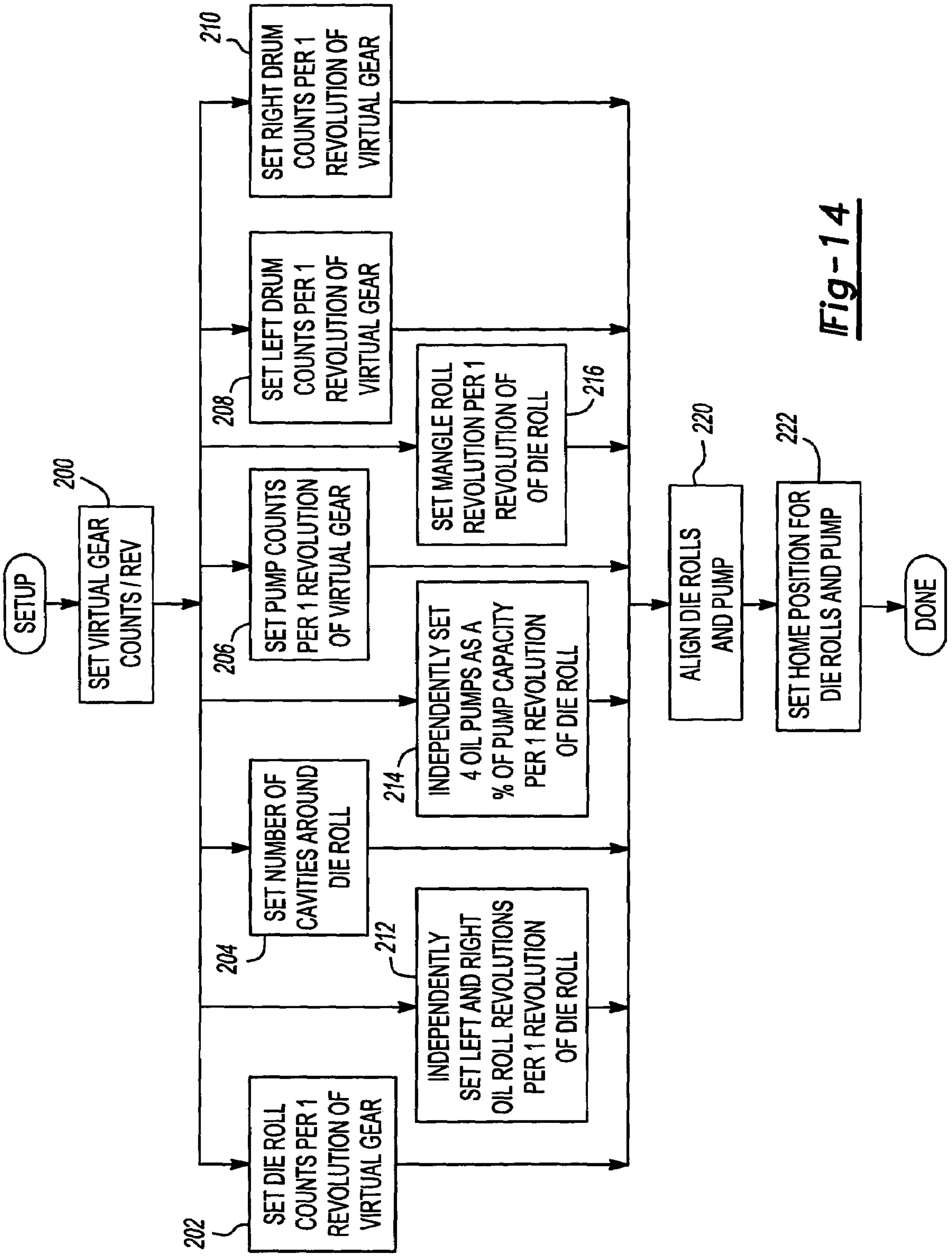
FIG. 14 is a flowchart showing the setup steps for programming the controller and preparing the encapsulation machine of FIG. 1 for operation.

Each pair of dies 42, 44 is associated with a specific pump assembly 78 and wedge assembly 40 to insure the proper quantity and location of fill material positioned between the two gelatin sheets during the production of soft gel capsules. To setup encapsulation machine 20, a variety of steps must be performed, as shown in the flowchart of FIG. 14. The first step in setting up control system 170 is to set the number of counts per revolution of the virtual gear, as indicated in block 200. The counts represent the number of incremental movements the virtual gear will go through during one revolution. The higher the number of counts, the greater the number of discrete positions the virtual gear can be located in at any given time during operation of encapsulation machine 20. After establishing the number of counts per revolution for the virtual gear, relationships between the various components and the virtual gear are programmed/established. As indicated in block 202, the relationship between the rotation of the dies 42, 44 (rotation of servomotor 58) relative to the virtual gear is established by setting the number of counts for the servomotor 58 per one revolution of the virtual gear. This establishes that for each revolution of the virtual gear the servomotor (dies) will produce that number of counts and complete one revolution. Thus, a relationship between the rotation of the dies and the virtual gear has been programmed. The number of cavities on the die is also entered into control system 170, as indicated in block 204. The number of cavities around the die is necessary to coordinate the operation of servomotor 86 driving pump assembly 78. As indicated in block 206, the number of counts per one revolution of the virtual gear is programmed for servomotor 86 driving pump assembly 78 thus providing a set relationship between the rotation of the virtual gear and servomotor 86 (pump assembly 78). As indicated in block 208 and 210, a number of counts for the left and right servomotors 26, 28 driving the respective left and right casting drums 24 for one revolution of the virtual gear are programmed into control system 170. Thus, a relationship between each of the casting drums and the rotation of the virtual gear is established. With the relationships defined between the virtual gear, dies 42, 44, pump assembly 78 and casting drums 24, the operation of each of these components is linked to the virtual gear and a relationship between one of these components and any other of these components can be established through the relationship to the virtual gear. For example, for a given rotational rate for a die the associated rate of rotation for any of the other components can be determined through their defined relationships to the virtual gear.

In addition to setting the relationships of the servo-driven components to the virtual gear, a relationship between the operation of the non-servo-driven components needs to be programmed into control system 170. The rate of rotation of the non-servo-driven components is important to the operation of encapsulation machine 20, however, the position of these non-servo-driven components is less important and, thus, these non-servo-driven components are not keyed to the operation of the virtual gear. Rather, these non-servo-driven components are keyed to the operation of the servo-driven component that is used to adjust the rate of production of encapsulation machine 20. As will be discussed in more detail below, the operator of encapsulation machine 20 will control the rate of operation by adjusting the speed of rotation the dies. Thus, in this embodiment the non-servo-driven components are keyed to the rotation of the dies. As indicated in block 212, a relationship between each of the left and right oil roll assemblies 30 per one revolution of the die is entered into control system 170. Each of the left and right oil roller assemblies 30 can have a different relationship for one revolution of the die. Each of the four oil pumps supplying the second and third rollers 34, 36 of the left and right oil roller assemblies 30 can be independently keyed to the operation of the die roll. Specifically, a percentage of the pump capacity for each of the four oil pumps per one revolution of the die is programmed into control system 170, as indicated in block 214. Thus, as the speed of the die changes, the operation of the four oil pumps will also change based on this relationship. The revolutions of the mangle rollers per one revolution of the die is also entered into control system 170, as indicated in block 216. Other relationships can also be programmed into control system 170, such as temperatures of the wedge and spreader boxes, vertical positioning of wedge assembly 40, as dictated by the specific application.

With the various operational relationships programmed/entered, control system 170 can be used to control the operation of encapsulation machine 20. Before the setup is completed, however, the dies and pump are aligned to ensure their synchronization at the beginning of operation of encapsulation machine 20. This is a accomplished by jogging the servomotors controlling the dies and the fill mechanism until they are in the desired locations, as indicated in block 220. With the servo-driven components in their desired aligned positions, the home position for the dies and pump is entered into control system 170, as indicated in block 222. Specifically, once these servo-driven components are in their desired locations, a simple push on the appropriate location on touch screen 168 causes control system 170 to record the exact positions of the servo-driven dies and pump assembly so that at a later time a simple push on the home input button on touch screen 168 will return these components to the set home position. With the home position now set, the setup of encapsulation machine 20 is completed. It should be appreciated the sequencing of the relationship programming can deviate from the above described sequence.

Figure 15:
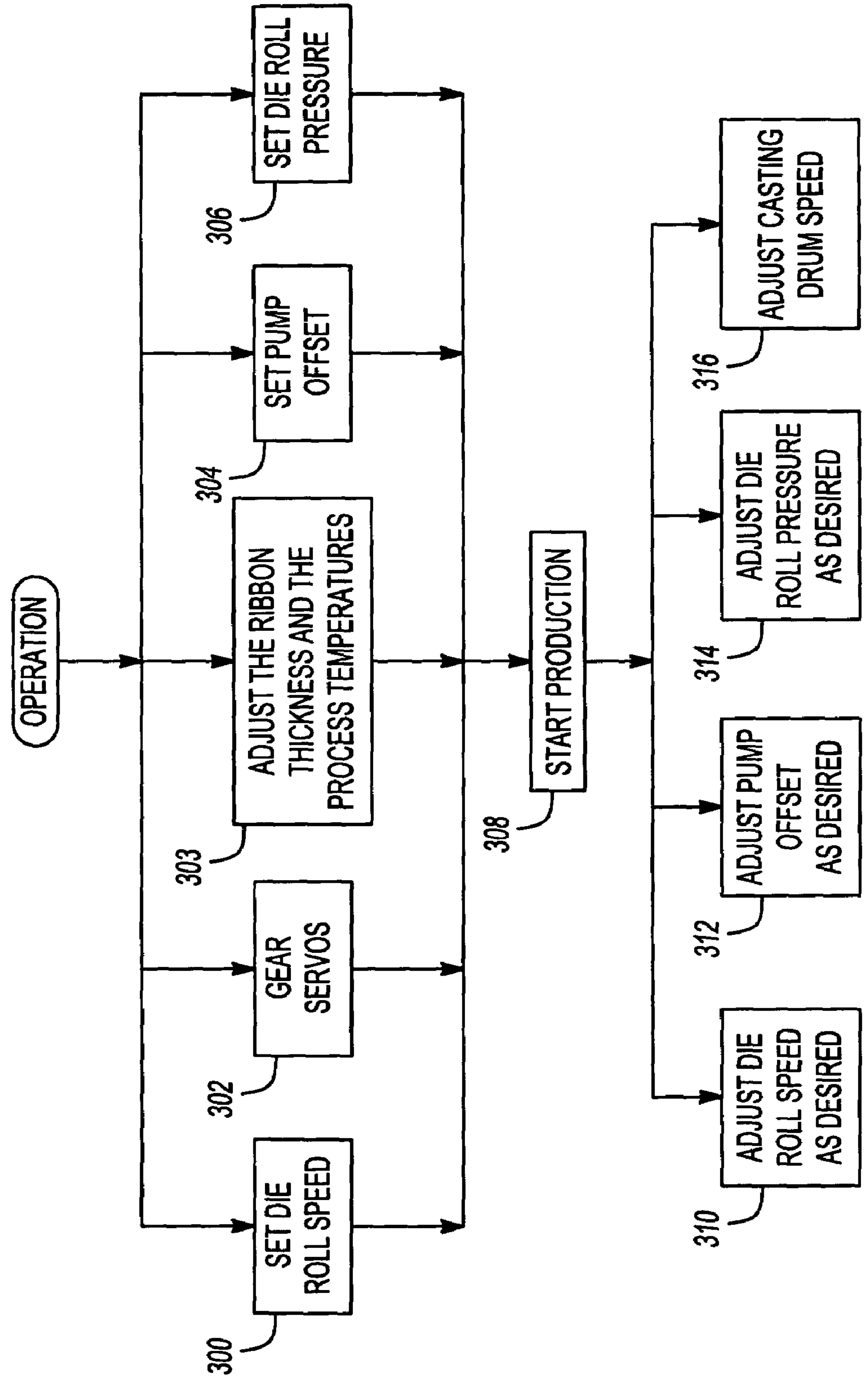
FIG. 15 is a flowchart showing the operation of the encapsulation machine of FIG. 1.

Referring now to FIG. 15, a flowchart representing the operation of encapsulation machine 20 is shown. This flowchart assumes the ribbons have already been established and fed through the machine. To operate encapsulation machine 20, a desired die speed is entered into control system 170, as indicated in block 300. The user will also inform control system 170 to gear the servos together, as indicated in block 302. When this command is entered into control system 170, the programmed relationships established during the setup are implemented and the operation of each of these components is controlled based upon these entered relationships. The ribbon thickness and the process temperatures are adjusted, as indicated in block 303. The pump assembly 78 offset is also entered into control system 170, as indicated in block 304. Preferably, the offset defaults to zero. The pump offset is used to fine tune the synchronization between operation of fill mechanism 50 and dies 42, 44. Additionally, the die pressure is set, as indicated in block 306. The die pressure is entered into control system 170 and alters the pressure between dies 42, 44 as created by pneumatic cylinders 60 and the pressure regulator controlling pneumatic cylinders 60. Control system 170 receives a feedback from the regulator controlling pneumatic cylinder 60 and is displayed on monitor 168. Additionally, control system 170 records the die pressure over time during the operation of encapsulation machine 20 which can be later used to determined potential causes of failure and/or improper operation by an operator of encapsulation machine 20. Additionally this monitored data can be used for real-time control by comparing to a data table and altering operation accordingly. Again, it should be appreciated that steps 300, 302, 303, 304 and 306 can be implemented in a different sequence.

With the steps in blocks 300, 302, 303, 304 and 306 completed the production of soft gel capsules with encapsulation machine 20 can begin, as indicated in block 308. With production of soft gel capsules ongoing, the operator of encapsulation machine 20 can make various adjustments in the operation of encapsulation machine 20 as desired. For example, as indicated in block 310, the operator can adjust the die speed as desired to increase or decrease the rate of production of soft gel capsules. Additionally, the operator can adjust the pump offset as desired, as indicated in block 312. By adjusting the pump offset the operator can fine tune the operation of encapsulation machine 20 to ensure that the fill material is dispensed at the appropriate time and the soft gel capsules conform to the desired specifications. Preferably, the pump offset adjustments are limited to a specific range. The operator can also adjust the die roll pressure as desired, as indicated in block 314. The die pressure is adjusted to ensure that a proper sealing occurs between the opposing halves of the soft gel capsules and proper encapsulation of the fill material therein. The rate of rotation of casting drums 24 can also be adjusted, as indicated in block 316.

The setting of die speed in step 300 allows control system 170 to adjust the operation of the other servo-driven components and the non-servo-driven components of encapsulation machine 20 based upon the relationships between these various components entered during the setup of encapsulation machine 20. As the operator adjusts the die speed during production of soft gel capsules, control system 170 automatically adjusts and synchronizes the operation of the other servo-driven and non-servo-driven components based upon these programmed relationships. Thus, the control system 170 allows automatic synchronization between these various components based upon changes in die speed as requested by the operator of encapsulation machine 20. It should be appreciated that operation of a different component could be controlled by the operator during production, if desired, and control system 170 will adjust the operation of the other components based on the programmed relationships.

Figure 16:
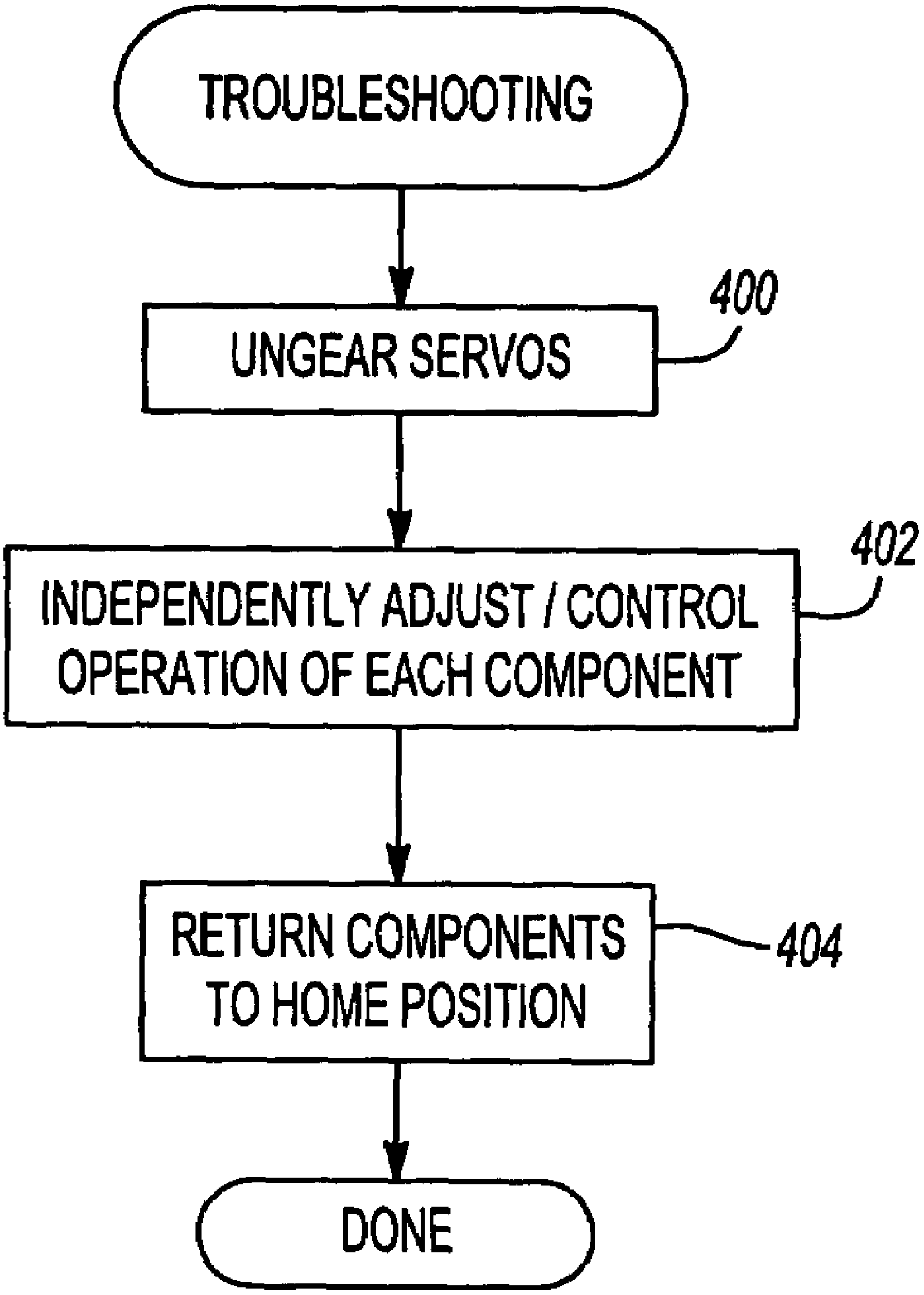
FIG. 16 is a flowchart of the troubleshooting/sheet setup for the encapsulation machine of FIG. 1.

Referring now to FIG. 16, the procedure for troubleshooting encapsulation machine 20 is shown. During troubleshooting, the user or operator of encapsulation machine 20 is able to independently control and operate the servo and non-servo-driven components of encapsulation machine 20 through control system 170. To do this, the user will first ungear the servos, as indicated in block 400. With the servos ungeared, the user can then independently adjust and control the operation of each of these components through control system 170 and the touch screen 168, as indicated in block 402. The operator will adjust and control the operation of these components as needed to troubleshoot the components with which difficulty is being experienced during the operation of encapsulation machine 20. When the troubleshooting is completed, the servo-driven components are returned to their home position by entering the appropriate command and into control system 170, as indicated in block 404. This automatically returns the servo-driven dies and pump assembly to their home position and synchronizes these components and eliminates the need for the operator to manually synchronize these components thus enabling a quicker return to operation of encapsulation machine 20. With the components returned to their home position, operation of encapsulation machine 20 can then commence by following the steps described above and shown in FIG. 15.

Control system 170 can also be used to perform test runs or establish new operating parameters for different soft capsules produced and different fill materials encapsulated therein. That is, control system 170 allows the various components to be independently controlled and altered to determine their influence on quality and ascertain the desired operational parameters to produce a soft capsule containing a desired fill material within desired product specifications. The use of control system 170 and servo-driven motors allows for an infinite adjustment between the various servo-driven components and non-servo-driven components that speed up the determination of desired operating parameters by avoiding the necessity of changing mechanical gears and linking these components together. Thus, control system 170 is advantageous and provides a quick and easy means for establishing desired operational parameters for production of different types of soft capsules with different ribbon materials.

While the present invention has been described with reference to the preferred embodiment and includes references to specific servo drives, interface devices, CPUs and others, it should be appreciated that other components having similar functionality and capabilities can be employed. Additionally, while the present invention has been described in reference to an encapsulation machine 20 operable to produce soft gel capsules, the principles of the present invention are also applicable to hard encapsulation machines, such as the capsule making machines disclosed in U.S. Pat. No. 6,000,928 entitled “Capsule Making Machine Having Improved Pin Bars and Airflow Characteristics” and assigned to the assignee of the present invention and U.S. Pat. No. 5,945,136 entitled “Heating Elevator for Capsule Making Machine” assigned to the assignee of the present invention both disclosures of which are incorporated herein by reference. For example, a hard encapsulation machine can include servo-driven components and utilize a virtual gear to establish operational relationships between the various servo components and non-servo-driven components that allow easy synchronization and operation of the encapsulation machine. Thus, the present invention is not limited to soft capsule making machines. It is noteworthy that the term “hard” and “soft” capsules are relative terms and that “hard” capsules are harder and more rigid than “soft” capsules but may have some flexibility. Additionally, while the capsules and sheets have been described with reference to gel and gelatine other materials and substances can be used to form sheets and capsules and still be within the scope of the present invention. Furthermore, the present invention can be used with encapsulation machines that do not include casting drums and a spreader box and instead rely upon preformed ribbons that are supplied to the encapsulation machine. Moreover, it should be appreciated that instead of using a virtual gear or virtual master, the control system can slave the various components of the encapsulation machine to one of the components of the encapsulation machine with programmed relationships and control the components based on the programmed relationships. Additionally, because the exact position of the casting drums is not needed, the casting drums could be driven by a non-servomotor, such as a variable speed AC motor. Thus, the description of the invention is merely exemplary in nature and variations that do not depart from the gist of the invention are intended to be in the scope of the invention. Such variations are not to be regarded as a departure from the spirit and scope of the invention.

What is claimed is:

1. A soft gel encapsulation machine comprising:
a fill mechanism operable to deliver a fill material;
at least a pair of dies; and
a control device operable to control operation of said fill mechanism and said dies,
wherein said control device is a programmable controller that uses a first movement relationship between said fill mechanism and a programmed reference, uses a second movement relationship between said dies and said programmed reference, and controls operation of said fill mechanism and said dies based on said first and second movement relationships to said programmed reference.

2. The soft gel encapsulation machine of claim 1, further comprising a pair of casting drums operable to form a sheet material from a flowable mass, wherein said control device uses a third movement relationship between said casting drums and said programmed reference and is operable to control operation of said casting drums based on said third movement relationship.

3. The soft gel encapsulation machine of claim 2, further comprising:
a plurality of servomotors operable to drive said fill mechanism, said casting drums and said dies;
a plurality of servo controllers operable to control said servomotors; and
said dies operably rotate and include sets of capsule forming cavities;
said fill material including an ingestible pharmaceutical.

4. The soft gel encapsulation machine of claim 1, further comprising a serial communication ring linking said fill mechanism and said dies to said control device.

5. The soft gel encapsulation machine of claim 4, wherein said serial communication ring includes fiber optic cables.

6. A capsule machine comprising:
a fill mechanism operable to deliver a fill material;
a first servomotor operable to mechanically independently drive said fill mechanism;
at least first and second dies, said first die being driven by a servomotor and said second die being mechanically linked to said first die with movement of said first die causing movement of said second die;
a second servomotor operable to mechanically independently drive said first die; and
a control device operable to control operation of said first and second servomotors.

7. The capsule machine of claim 6, further comprising:
first and second casting drums operable to form a sheet material from a flowable mass; and
third and fourth servomotors each respectively operable to drive said first and second casting drums independently of one another,
wherein said control device controls operation of said first, second, third and fourth servomotors independently of one another.

8. The capsule machine of claim 6, wherein the fill mechanism delivers a medicine.

9. The capsule machine of claim 6, wherein said fill material mechanism includes a plurality of opposing pumps that are driven by said first servomotor.

10. The capsule machine of claim 6, wherein said control device has a virtual gear, said first and second servomotors each have respective first and second relationships to said virtual gear and said controller operates said first and second servomotors based on said first and second relationships to said virtual gear.

11. A capsule machine comprising:
a fill mechanism operable to deliver a fill material;
dies operable to form soft capsules from at least two sheets of material;
a pressure device operable to apply pressure between said dies independently of operable of said fill mechanism; and
a controller operable to control said dies and said pressure device,
wherein said controller monitors a pressure between said dies during operation of said dies.

12. The machine of claim 11, wherein said pressure device includes a regulator operable to adjust said pressure applied between said dies and to send a signal to said controller indicative of said pressure being applied.

13. The machine of claim 11, wherein said pressure device includes a fluidic cylinder.

14. The machine of claim 11, further comprising a display device and said pressure being monitored by said controller is displayed on said display device.

15. The machine of claim 11, wherein said controller records said pressure.

16. A capsule machine comprising:
a first moveable member;
a first servomotor operable to mechanically independently drive said first moveable member; and
a control device operable to control operation of said first servomotor, said control device having a virtual gear,
wherein said first servomotor has a first relationship with said virtual gear and said controller operates said first servomotor based on said first relationship.

17. The capsule machine of claim 16, further comprising:
a second moveable member; and
a second servomotor operable to mechanically independently drive said second moveable member, said second servomotor having a second relationship with said virtual gear,
wherein said controller operates said second servomotor based on said second relationship.

18. The capsule machine of claim 17, wherein said first moveable member is a fill mechanism and said second moveable member is at least one die.

19. The capsule machine of claim 16, wherein said first relationship can be changed.

20. A soft gel encapsulation machine comprising:
a fill mechanism operable to deliver a fill material;
at least a pair of dies;
a virtual relationship between said fill mechanism and said dies;
a control device operable to control operation of said fill mechanism and said dies based on said virtual relationship; and
a serial communication ring linking said fill mechanism and said dies to said control device.

21. The soft gel encapsulation machine of claim 20, further comprising a first servomotor operable to drive said fill mechanism and wherein said virtual relationship includes a virtual gear and said first servomotor has a first relationship with said virtual gear and said controller operates said first servomotor based on said first relationship.

22. The soft gel encapsulation machine of claim 21, further comprising a second servomotor operable to drive said dies, said second servomotor has a second relationship with said virtual gear and said controller operates said second servomotor based on said second relationship.

23. The soft gel encapsulation machine of claim 20, wherein said virtual relationship can be changed.

24. The soft gel encapsulation machine of claim 1, wherein said fill mechanism delivers a liquid.

25. The soft gel encapsulation machine of claim 1, wherein said fill mechanism delivers at least one of a paint and dye substance.

26. The soft gel encapsulation machine of claim 1, wherein said fill mechanism delivers an ingestible pharmaceutical.

27. The capsule machine of claim 6, further comprising a virtual relationship between said fill mechanism and said dies and wherein said control device controls operation of said first servomotor based on said virtual relationship.

28. The capsule machine of claim 27, wherein said virtual relationship includes a virtual gear, said fill mechanism has a first relationship with said virtual gear, said dies have a second relationship with said virtual gear, and said control device controls operation of said first servomotor based on said first relationship.

29. The capsule machine of claim 6, wherein said fill mechanism delivers a liquid.

30. The capsule machine of claim 6, wherein said fill mechanism delivers at least one of a paint and dye substance.

31. The capsule machine of claim 6, wherein said fill mechanism delivers an ingestible pharmaceutical.

32. The machine of claim 11, wherein said fill mechanism is operable to deliver said fill material to cavities in said dies.

33. The machine of claim 32, wherein said fill mechanism delivers an ingestible pharmaceutical.

34. The machine of claim 32, wherein said fill mechanism delivers a liquid.

35. The machine of claim 32, wherein said fill mechanism delivers at least one of a paint and dye substance.

36. The machine of claim 32, wherein said fill mechanism delivers a medicine.

37. The machine of claim 11, wherein said controller continuously records said pressure.

38. The machine of claim 11, wherein said controller records said pressure when a change in die pressure is performed.

39. The soft gel encapsulation machine of claim 1, wherein the first and second movement relationships with the programmed reference are numerical movement relationships.

* * * * *